US00RE49292E

(19) United States
(12) Reissued Patent
LoCascio et al.

(10) Patent Number: US RE49,292 E
(45) Date of Reissued Patent: Nov. 15, 2022

(54) ROTARY DRUM SCREEN METHOD FOR THIN STILLAGE FILTRATION

(71) Applicant: Water Solutions Technology, LLC, Sioux Falls, SD (US)

(72) Inventors: Michael B. LoCascio, Clear Lake, IA (US); Stephen D. Allen, Salt Lake City, UT (US)

(73) Assignee: WATER SOLUTIONS TECHNOLOGY, LLC, Sioux Falls, SD (US)

(21) Appl. No.: 17/331,046

(22) Filed: May 26, 2021

Related U.S. Patent Documents

Reissue of:
(64) Patent No.: 10,463,998
Issued: Nov. 5, 2019
Appl. No.: 16/257,646
Filed: Jan. 25, 2019

U.S. Applications:
(63) Continuation of application No. 15/936,191, filed on Mar. 26, 2018, now Pat. No. 10,188,970.

(51) Int. Cl.
*B01D 33/11* (2006.01)
*B01D 21/01* (2006.01)
(Continued)

(52) U.S. Cl.
CPC ..... *B01D 33/11* (2013.01); *B01D 21/01* (2013.01); *B01D 33/067* (2013.01); *B01D 33/463* (2013.01); *B01D 33/72* (2013.01)

(58) Field of Classification Search
CPC ..... B01D 21/01; B01D 33/067; B01D 33/72; B01D 33/463; B01D 33/11
See application file for complete search history.

(56) References Cited

U.S. PATENT DOCUMENTS 3,876,548 A 4/1975 Welles, Jr.
4,215,447 A * 8/1980 Gartland ..... D21C 9/06 8/156
(Continued)

FOREIGN PATENT DOCUMENTS

DE 2431876 A1 6/1975
GB 2059469 A * 4/1981 ..... D21C 9/06
(Continued)

*Primary Examiner* — Carlos N Lopez
(74) *Attorney, Agent, or Firm* — Kirton McConkie; Evan R. Witt

(57) ABSTRACT

A rotating drum screen method for separating solids from thin stillage obtained from ethanol fermentation, the thin stillage comprising one or more of solids and suspended solids. Thin stillage is chemically treated with an anionic polymer to form stable particles of one or more of solids and suspended solids. Introducing the treated thin stillage into a rotating drum screen system. The drum screen includes a filter screen that retains at least a portion of the solids within a hollow portion of the drum screen and which produces a liquid effluent that is discharged from an outer surface of the drum screen. The retained solids are removable from the drum screen via a solid discharge end. A head box is disposed within the hollow portion of the drum screen and has a plurality of fluid flow channel dividers dividing and directing an influent stream outwardly against the drum screen.

40 Claims, 19 Drawing Sheets

(51) Int. Cl.
*B01D 33/067* (2006.01)
*B01D 33/46* (2006.01)
*B01D 33/72* (2006.01)

(56) References Cited

U.S. PATENT DOCUMENTS 4,236,999 A 12/1980 Burgess et al.
4,554,259 A * 11/1985 Franklin ..... C03C 3/093 428/428
4,557,120 A * 12/1985 Sundman ..... D21C 9/06 68/58
5,801,109 A * 9/1998 Nishizawa ..... C03C 3/091 501/66
6,537,937 B1 * 3/2003 Nishizawa ..... C03C 3/091 501/66
6,868,973 B1 * 3/2005 Kamo ..... B01D 33/11 210/403
9,643,884 B2 * 5/2017 Ellison ..... C03B 17/02
2012/0125859 A1 * 5/2012 Collins ..... B01D 17/0217 210/708
2015/0048024 A1 * 2/2015 Grelot ..... C02F 3/2853 210/608
2015/0114901 A1 4/2015 Maupin
2015/0343343 A1 * 12/2015 DeWaard ..... B01D 33/50 210/787
2017/0152471 A1 * 6/2017 Allen ..... C12N 1/16
2019/0291030 A1 * 9/2019 LoCascio ..... B01D 33/72

FOREIGN PATENT DOCUMENTS

WO WO-9410373 A1 * 5/1994 ..... D21C 9/06
WO WO-9963150 A1 * 12/1999 ..... D21C 9/06
WO WO-2010116026 A1 * 10/2010 ..... D21D 1/40
WO WO-2012138048 A2 * 10/2012 ..... B01D 33/067
WO WO-2019245422 A1 * 12/2019 ..... B01D 33/64

* cited by examiner

ROTARY DRUM SCREEN METHOD FOR THIN STILLAGE FILTRATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation of prior application Ser. No. 15/936,191, filed Mar. 26, 2018, and titled ROTARY DRUM SCREEN FOR THIN STILLAGE FILTRATION, which is incorporated by reference.

BACKGROUND OF THE INVENTION

1. Field of the Invention

The present invention relates to separation of solids and liquids remaining after fermentation of grains and cellulosic plants to produce fuel and potable ethanol, and more particularly to a drum screen for use in separating solids and liquids after addition of a polymer to thick and/or thin stillage remaining after the fermentation.

2. Background and Related Art

Fermentation is a biological process that uses yeasts to convert simple sugars into ethanol. Feedstocks such as grains, fruits, and cellulosic plant matter may provide a source of fermentable sugar. Fermentation processes can be used to generate potable ethanol in the form of liquors and other alcoholic beverages as well as to generate industrial or fuel ethanol. Fermentation is often coupled with distillation processes that separate the ethanol from the fermentation mixture. While the fermentation and distillation processes can effectively produce and isolate ethanol, the remaining liquids and solids can pose a problem for operators of ethanol production facilities. The remaining liquids and solids must either be disposed of or undergo further processing to generate viable commodities. Both disposal and/or processing of these remaining liquids and solids can increase the costs and complexity of ethanol production. For example, while further processing of the remaining liquids can render them suitable to be reused at least in part in the fermentation process, this further processing can be costly and there are limits to the amount of liquid that can be recycled. Likewise, there are increased costs and limitations to further processing the remaining solids into useful products.

Grains, including corn, are often used in the production of both fuel and potable ethanol via a fermentation process. The grain is often ground into a flour, and the flour is mixed with water, backset (recycled byproducts of previous fermentation processes), and enzymes, then heated to kill any bacteria present. The result is a cooked mash that can be held in a tank to allow complete liquefaction of the mixture, then cooled and pumped into fermenters.

In the fermenters, yeast is added to the mash to start fermentation. The yeast converts the simple sugars in the mash to alcohol, releasing carbon dioxide, which can be captured and liquefied for sale. After an appropriate time has passed, such as approximately two days, the alcohol-containing mash, which may be referred to as beer, may be pumped to a distillation unit that strips all the alcohol from the beer. The resulting alcohol may be further purified for fuel or potable purposes, and additives may be added in some instances.

The liquid and solid mixture that remains following the alcohol distillation is commonly called thick stillage or whole stillage. The thick stillage contains solids in various forms that prevent the thick stillage from being economically reused in the fermentation process and that further prevent the thick stillage from being simply discharged into the environment. Accordingly, various processes are used to remove solids from the thick stillage. Commonly, liquid-solid separation devices, such as centrifuges, are used to separate liquid from the solids. The more-solid portion so removed from the thick stillage is often referred to as wet distiller's grain, which may contain from about 7% to about 17% solids by weight. The resulting more-liquid portion is commonly called thin stillage, and still contains dissolved solids, some suspended solids, and fatty acids, as well as residual yeast from the fermentation and other unfermentable products such as hemicellulose, yeasts, and other solids typically associated with structural components of the feedstock (e.g., biotins, dextrans, and other similar components). The wet distiller's grain may be sold as-is, or it may be dried into dried distiller's grain.

The thin stillage still contains solids at a level that prevents discharge of the thin stillage into the environment. The thin stillage also contains oil from the distilled grain, such as corn oil, that may be captured or extracted to create a valuable co-product that can be used, for example, in biodiesel manufacture, as an animal feed additive, or for enhancing the quality and flowability of the dried distiller's grain. Additionally, a portion of the thin stillage may be recycled into the fermentation process as the backset; however, the ratio of thin stillage that can be used as backset is limited in part because of the total solids (TS), total suspended solids (TSS), total dissolved solids (TDS), and unfermentable components found in the thin stillage. Accordingly, the thin stillage cannot ethically be discharged into the environment, cannot be completely reused, and still contains co-products of some value, and producers of ethanol have continued to develop processes and systems by which to separate the remaining solids and oils from the water of the thin stillage.

Unfortunately, the processes and systems in use to date have not proved adequate or fully economical to the task of separating the solids from the thin stillage. One typical method for separation of the water from the remaining oil and solids is the use of evaporators that evaporate the water out of the thin stillage, thus concentrating the solids content into a product called syrup. The syrup is sometimes sold directly as a feed additive, or can be mixed back into the wet distiller's grain to be dried into the dried distiller's grain. Corn oil may be extracted from the syrup and used as discussed previously. While the evaporated water may be condensed and reused in the fermentation and/or distillation processes, the evaporation process is an energy-intensive process that increases the cost of the resultant products and/or of treating the thin stillage to a point where the resultant water can be safely discharged into the environment.

The water that makes up the recipe/mix for a new fermentation (cooking) batch is made up of 1) evaporation condensate (majority); 2) $CO_2$ scrubber water (smallest amount); and 3) backset. If an ethanol fermentation plant had enough evaporation capacity it would send nearly all evaporation condensate back to begin the cooking process. But since ethanol fermentation plants do not have sufficient evaporation capacity, primarily because the evaporation process is very energy intensive and expensive, ethanol fermentation plants return a fraction of the thin stillage untreated as "backset" to the fermentation (cook) process.

As an alternative to an evaporative process, producers of ethanol also have used addition of a variety of polymers, such as anionic and/or cationic polymers, which are intended to create bonds with the remaining suspended or dissolved solids to create larger particles of solids that can be separated or filtered from the thin stillage, such as is disclosed in U.S. Patent Application Publication No. US 2017/0152471 to Allen et al. and in U.S. Pat. No. 7,497,955 to Scheimann et al., both of which are incorporated herein by reference. Unfortunately, the bonds created by the addition of the polymers to the thin stillage are generally too weak to hold up to high-energy separation applications such as centrifuges, plates and frames, or general screens. Accordingly, when high-energy separation processes are attempted, a significant number of the bonds break, causing lost oil recovery and increased total suspended solids. As a result, the backset that is recycled into the process has a higher solid content, reducing the percentage of new solids that can be applied to the front end of the fermentation process, and because the solids of the backset represent largely non-fermentable solids, the increased solids in the backset reduce the efficiency of the fermentation process.

One high-energy separation process that is sometimes used to separate solids from liquids is drum screens. A traditional drum screen is a course separation technology used to remove physically large and hard objects from a liquid stream. In traditional drum screen uses, there is no concern for how gentle the screening process is. Accordingly, traditional drum screens are inappropriate for use in separating polymer-aggregated solids from an ethanol production process.

Accordingly, there is continued need for improved systems and methods for separating suspended and dissolved solids and any other materials (e.g., corn oil) from thin stillage resulting from an ethanol fermentation and distillation process and system. The thin stillage is typically received as a hot (over 75° C.), acidic (typically less than 4.5 pH) liquid with approximately 4% to approximately 6% total suspended solids and oils, and approximately 7% to approximately 8% total solids. The use of existing technology (thermal/chemical extraction techniques) only permits recovery in the range of approximately 74% to approximately 82% of the total amount of oil in the grain.

BRIEF SUMMARY OF THE INVENTION

Implementation of the invention provides systems and methods for separating solids from liquids in an influent material stream, such as from thin stillage from a distillation process. Implementation of the invention provides a rotating drum screen system or rotary drum screen system for separating solids from liquids.

According to certain implementations of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end, the drum screen including a filter screen that retains at least a portion of the solids within the hollow portion of the drum screen and which produces a liquid effluent that is discharged from an outer surface of the drum screen, the retained solids being removable from the drum screen via the solid discharge end. The rotating drum screen system also includes a head box disposed within the hollow portion of the drum screen proximate the influent inlet end and in fluid communication with the influent inlet, the head box having a plurality of fluid flow channel dividers dividing an influent stream received at the influent inlet into a plurality of ongoing streams and directing the plurality of ongoing streams outwardly against the drum screen.

The head box may further include a plurality of regulators individually regulating a flow of each of the plurality of ongoing stream, and the plurality of regulators may be operated to evenly distribute the influent stream among the plurality of ongoing streams. The head box may have a generally flat bottom sloped to ensure that the head box drains substantially completely upon termination of the influent stream. The head box may be disposed at an elevated position within the drum screen, such that the plurality of ongoing streams initially contact the drum screen at a position between a top-to-bottom centerline of the drum screen and approximately 30° below the top-to-bottom centerline of the drum screen. The elevated position of the head box may cause the plurality of ongoing streams to initially contact the drum screen at a position between approximately 5° to approximately 20° below the top-to-bottom centerline of the drum screen. The influent inlet and a portion of the head box in contact with the influent inlet may have a rectangular cross-section.

The drum screen may include a flight or series of flights extending from an inner surface of the drum screen along a spiral path, the flight or series of flights having a variable height along the drum screen, with a first, lower, height proximate the influent inlet end and permitting a discharge of the head box to be placed proximate the filter screen, and with a second, higher, height proximate the solid discharge end. The first, lower, height of the flight or series of flights proximate the influent end may be a height less than or equal to approximately 2.5 cm. The ongoing streams leaving the discharge of the head box may have a depth of between 0.05 cm and 4.0 cm. The flight or series of flights may be permanently affixed to screen sections of the filter screen to form screen-flight sections, which screen-flight sections are reversibly affixed to a drum frame of the rotating drum screen system to form the drum screen. Alternatively, the flight or series of flights may be permanently affixed to a drum frame of the rotating drum screen system to form a drum-frame-flight assembly, and screen sections may be affixed to an outer surface of the drum-frame-flight assembly. The screen sections may be affixed to the outer surface of the drum-frame-flight assembly via either permanent affixation or reversible affixation.

The rotating drum screen system may include a screen cleaning system having a plurality of spray bars operatively connected to a fluid source and adapted to spray a fluid through the filter screen in an exterior-to-interior direction. The fluid sprayed by the spray bar may be air, a mixture of air and an aqueous solution, or an aqueous solution.

The drum screen may have a non-stick perfluorocarbon coating disposed on the filter screen. The non-stick perfluorocarbon coating may include a material such as polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

According to certain alternative implementations of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end. The rotating drum screen system also includes the drum screen, which includes a drum frame defining a generally cylindrical volume and a plurality of screen-flight sections reversibly affixed to the drum frame, each screen-flight sections comprising a portion of a filter screen adapted to retain at least a portion of the solids within the hollow portion of the drum screen and a portion of a flight or series of flights permanently affixed to the filter screen. The drum screen is adapted to produce a liquid effluent that is discharged from an outer surface of the drum screen with retained solids being removable from the drum screen via the solid discharge end.

The screen-flight sections may together form a flight or series of flights extending from an inner surface of the drum screen along a spiral path, the flight or series of flights having a variable height along the drum screen, with a first, lower, height proximate the influent inlet end and with a second, higher, height proximate the solid discharge end.

The rotating drum screen system may also include a head box disposed within the hollow portion of the drum screen proximate the influent inlet end and in fluid communication with the influent inlet, the head box having a plurality of fluid flow channel dividers dividing an influent stream received at the influent inlet into a plurality of ongoing streams and directing the plurality of ongoing streams outwardly against the drum screen, wherein the first, lower, height of the flight or series of flights permits a discharge of the head box to be placed proximate the filter screen. The head box may further include a plurality of regulators individually regulating a flow of each of the plurality of ongoing stream, and wherein the plurality of regulators may be operated to evenly distribute the influent stream among the plurality of ongoing streams. The head box may have a generally flat bottom sloped to ensure that the head box drains substantially completely upon termination of the influent stream. The head box may be disposed at an elevated position within the drum screen, such that the plurality of ongoing streams initially contact the drum screen at a position between a top-to-bottom centerline of the drum screen and approximately 30° below the top-to-bottom centerline of the drum screen. The elevated position of the head box may cause the plurality of ongoing streams to initially contact the drum screen at a position between approximately 5° and approximately 20° below the top-to-bottom centerline of the drum screen. The elevated position of the head box may cause the plurality of ongoing streams to initially contact the drum screen at a position between approximately 4° and approximately 34° below the top-to-bottom centerline of the drum screen.

The first, lower, height of the flight or series of flights proximate the influent end may be a height less than or equal to approximately 2.5 cm, and the second, higher, height of the flight or series of flights may be a height between 40% and 50% of a filter-screen-to-filter-screen diameter of the drum screen.

According to certain additional implementations of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end. The rotating drum screen system also includes the drum screen, which includes a filter screen adapted to retain at least a portion of the solids within the hollow portion of the drum screen. The filter screen includes a plurality of stainless steel filter elements defining a filter grid spacing for passage of liquid while retaining solids over a selected particle diameter and a non-stick perfluorocarbon coating disposed on the stainless steel filter elements. The drum screen is adapted to produce a liquid effluent that is discharged from an outer surface of the drum screen with retained solids being removable from the drum screen via the solid discharge end.

The non-stick perfluorocarbon coating may include a material such as polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

The rotating drum screen system may further include a drum frame defining a generally cylindrical volume and a plurality of screen-flight sections reversibly affixed to the drum frame, each screen-flight section comprising a portion of the filter screen adapted to retain at least a portion of the solids within the hollow portion of the drum screen and a portion of a flight or series of flights permanently affixed to the filter screen. The screen-flight sections may together form a flight or series of flights extending from an inner surface of the drum screen along a spiral path, the flight or series of flights having a variable height along the drum screen, with a first, lower, height proximate the influent inlet end and with a second, higher, height proximate the solid discharge end.

The rotating drum screen system may include a drum frame defining a generally cylindrical volume, a flight or series of flights permanently affixed to the drum frame and extending from an inner surface of the drum screen along a spiral path, the flight or series of flights having a variable height along the drum screen, with a first, lower, height proximate the influent inlet end and a second, higher, height proximate the solid discharge end, the flight or series of flights and the drum frame defining a drum-frame-flight assembly, and a plurality of filter screen sections affixed to an outer surface of the drum-frame-flight assembly.

The filter screen may permit passage of liquid at a rate of between 25 and 30 gallons per minute per square foot. The rotating drum screen may revolve at a rate of between approximately 4 revolutions per minute (rpm) and approximately 25 rpm. Higher rpms provide more surface area of filter screen for passage of liquid, solid accumulation, and solid removal. Accordingly, systems with higher flow and/or higher solids for removal may incorporate higher drum screen revolution rates (rpms).

While the direction of rotation of the drum screen is not important, the influent material stream is deposited onto the drum screen such that the direction of rotation of the drum screen is counter to the direction of the falling influent material stream when the influent material stream contacts the drum screen.

According to certain further implementations of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end. The system also includes the drum screen. The drum screen includes a drum frame defining a generally cylindrical volume, a flight or series of flights permanently affixed to the drum frame and extending from an inner surface of the drum screen along a spiral path, the flight or series of flights having a variable height along the drum screen, with a first, lower, height proximate the influent inlet end and a second, higher, height proximate the solid discharge end, the flight or series of flights and the drum frame defining a drum-frame-flight assembly, and a plurality of filter screen sections affixed to an outer surface of the drum-frame-flight assembly. The drum screen is adapted to produce a liquid effluent that is discharged from an outer surface of the drum screen with retained solids being removable from the drum screen via the solid discharge end.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
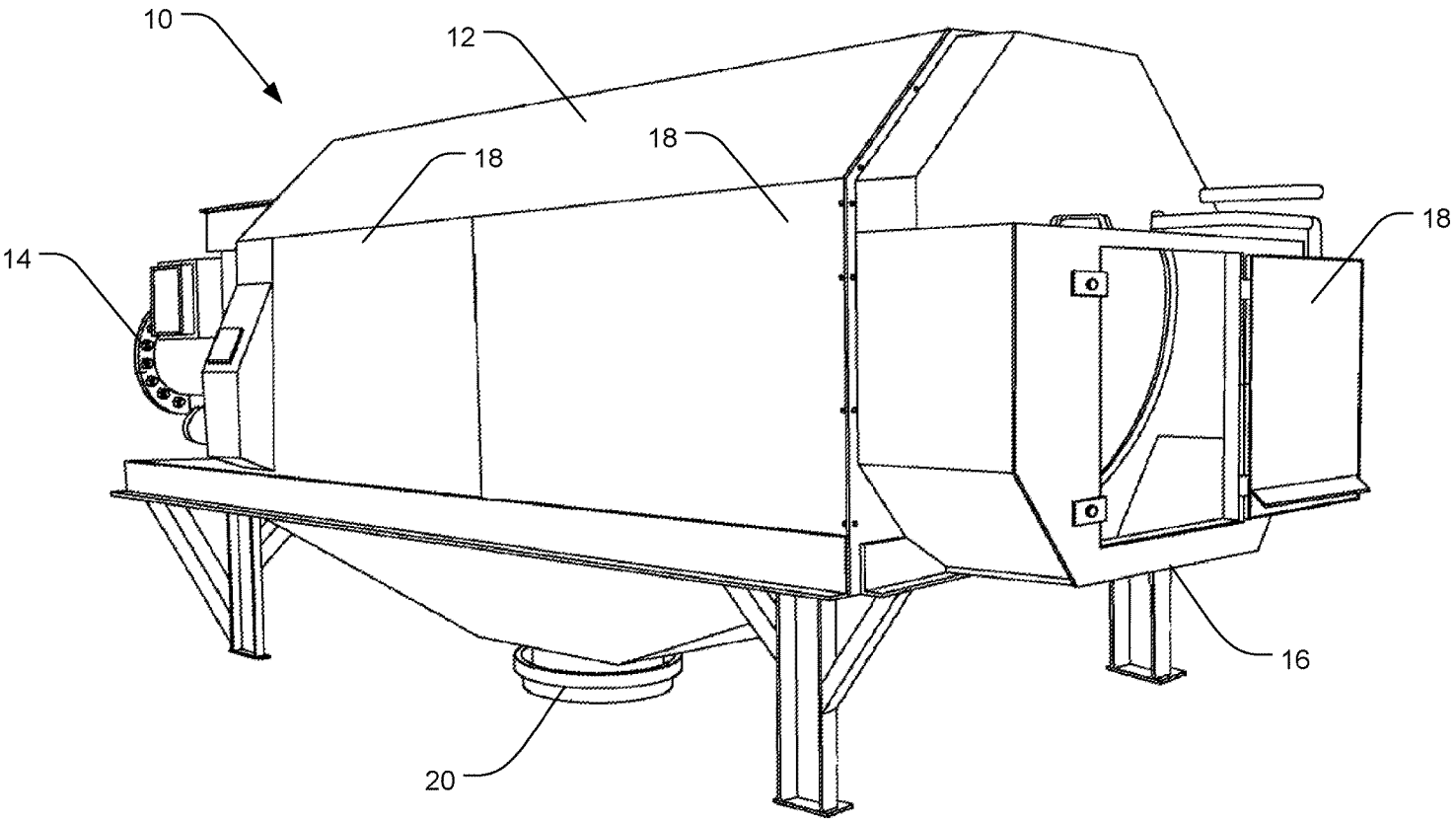
FIG. 1 shows a perspective view of a representative rotary drum screen system.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for separating solids from liquids in an influent material stream, such as from thin stillage from a distillation process. Embodiments of the invention provide a rotating drum screen system or rotary drum screen system for separating solids from liquids.

According to certain embodiments of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end, the drum screen including a filter screen that retains at least a portion of the solids within the hollow portion of the drum screen and which produces a liquid effluent that is discharged from an outer surface of the drum screen, the retained solids being removable from the drum screen via the solid discharge end. The rotating drum screen system also includes a head box disposed within the hollow portion of the drum screen proximate the influent inlet end and in fluid communication with the influent inlet, the head box having a plurality of fluid flow channel dividers dividing an influent stream received at the influent inlet into a plurality of ongoing streams and directing the plurality of ongoing streams outwardly against the drum screen.

The head box may further include a plurality of regulators individually regulating a flow of each of the plurality of ongoing stream, and the plurality of regulators may be operated to evenly distribute the influent stream among the plurality of ongoing streams. The head box may have a generally flat bottom sloped to ensure that the head box drains substantially completely upon termination of the influent stream. The head box may be disposed at an elevated position within the drum screen, such that the plurality of ongoing streams initially contact the drum screen at a position between a top-to-bottom centerline of the drum screen and approximately 30° below the top-to-bottom centerline of the drum screen. The elevated position of the head box may cause the plurality of ongoing streams to initially contact the drum screen at a position between approximately 5° to approximately 20° below the top-to-bottom centerline of the drum screen. The influent inlet and a portion of the head box in contact with the influent inlet may have a rectangular cross-section.

The drum screen may include a flight or series of flights extending from an inner surface of the drum screen along a spiral path, the flight or series of flights having a variable height along the drum screen, with a first, lower, height proximate the influent inlet end and permitting a discharge of the head box to be placed proximate the filter screen, and with a second, higher, height proximate the solid discharge end. The first, lower, height of the flight or series of flights proximate the influent end may be a height less than or equal to approximately 2.5 cm. The ongoing streams leaving the discharge of the head box may have a depth of between 0.05 cm and 4.0 cm. The flight or series of flights may be permanently affixed to screen sections of the filter screen to form screen-flight sections, which screen-flight sections are reversibly affixed to a drum frame of the rotating drum screen system to form the drum screen. Alternatively, the flight or series of flights may be permanently affixed to a drum frame of the rotating drum screen system to form a drum-frame-flight assembly, and screen sections may be affixed to an outer surface of the drum-frame-flight assembly. The screen sections may be affixed to the outer surface of the drum-frame-flight assembly via either permanent affixation or reversible affixation.

The rotating drum screen system may include a screen cleaning system having a plurality of spray bars operatively connected to a fluid source and adapted to spray a fluid through the filter screen in an exterior-to-interior direction. The fluid sprayed by the spray bar may be air, a mixture of air and an aqueous solution, or an aqueous solution.

The drum screen may have a non-stick perfluorocarbon coating disposed on the filter screen. The non-stick perfluorocarbon coating may include a material such as polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

According to certain alternative embodiments of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end. The rotating drum screen system also includes the drum screen, which includes a drum frame defining a generally cylindrical volume and a plurality of screen-flight sections reversibly affixed to the drum frame, each screen-flight section comprising a portion of a filter screen adapted to retain at least a portion of the solids within the hollow portion of the drum screen and a portion of a flight or series of flights permanently affixed to the filter screen. The drum screen is adapted to produce a liquid effluent that is discharged from an outer surface of the drum screen with retained solids being removable from the drum screen via the solid discharge end.

The screen-flight sections may together form a flight or series of flights extending from an inner surface of the drum screen along a spiral path, the flight or series of flights having a variable height along the drum screen, with a first, lower, height proximate the influent inlet end and with a second, higher, height proximate the solid discharge end.

The rotating drum screen system may also include a head box disposed within the hollow portion of the drum screen proximate the influent inlet end and in fluid communication with the influent inlet, the head box having a plurality of fluid flow channel dividers dividing an influent stream received at the influent inlet into a plurality of ongoing streams and directing the plurality of ongoing streams outwardly against the drum screen, wherein the first, lower, height of the flight or series of flights permits a discharge of the head box to be placed proximate the filter screen. The head box may further include a plurality of regulators individually regulating a flow of each of the plurality of ongoing stream, and wherein the plurality of regulators may be operated to evenly distribute the influent stream among the plurality of ongoing streams. The head box may have a generally flat bottom sloped to ensure that the head box drains substantially completely upon termination of the influent stream. The head box may be disposed at an elevated position within the drum screen, such that the plurality of ongoing streams initially contact the drum screen at a position between a top-to-bottom centerline of the drum screen and approximately 30° below the top-to-bottom centerline of the drum screen. The elevated position of the head box may cause the plurality of ongoing streams to initially contact the drum screen at a position between approximately 5° and approximately 20° below the top-to-bottom centerline of the drum screen. The elevated position of the head box may cause the plurality of ongoing streams to initially contact the drum screen at a position between approximately 4° and approximately 34° below the top-to-bottom centerline of the drum screen (e.g., 109°+/−15° around the drum screen from the uppermost point of the drum screen).

The first, lower, height of the flight or series of flights proximate the influent end may be a height less than or equal to approximately 2.5 cm, and the second, higher, height of the flight or series of flights may be a height between 40% and 50% of a filter-screen-to-filter-screen diameter of the drum screen.

According to certain additional embodiments of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end. The rotating drum screen system also includes the drum screen, which includes a filter screen adapted to retain at least a portion of the solids within the hollow portion of the drum screen. The filter screen includes a plurality of stainless steel filter elements defining a filter grid spacing for passage of liquid while retaining solids over a selected particle diameter and a non-stick perfluorocarbon coating disposed on the stainless steel filter elements. The drum screen is adapted to produce a liquid effluent that is discharged from an outer surface of the drum screen with retained solids being removable from the drum screen via the solid discharge end.

The non-stick perfluorocarbon coating may include a material such as polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

The rotating drum screen system may further include a drum frame defining a generally cylindrical volume and a plurality of screen-flight sections reversibly affixed to the drum frame, each screen-flight section comprising a portion of the filter screen adapted to retain at least a portion of the solids within the hollow portion of the drum screen and a portion of a flight or series of flights permanently affixed to the filter screen. The screen-flight sections may together form a flight or series of flights extending from an inner surface of the drum screen along a spiral path, the flight or series of flights having a variable height along the drum screen, with a first, lower, height proximate the influent inlet end and with a second, higher, height proximate the solid discharge end.

The rotating drum screen system may include a drum frame defining a generally cylindrical volume, a flight or series of flights permanently affixed to the drum frame and extending from an inner surface of the drum screen along a spiral path, the flight or series of flights having a variable height along the drum screen, with a first, lower, height proximate the influent inlet end and a second, higher, height proximate the solid discharge end, the flight or series of flights and the drum frame defining a drum-frame-flight assembly, and a plurality of filter screen sections affixed to an outer surface of the drum-frame-flight assembly.

The filter screen may permit passage of liquid at a rate of between 25 and 30 gallons per minute per square foot. The rotating drum screen may revolve at a rate of between approximately 4 revolutions per minute (rpm) and approximately 25 rpm. Higher rpms provide more surface area of filter screen for passage of liquid, solid accumulation, and solid removal. Accordingly, systems with higher flow and/or higher solids for removal may incorporate higher drum screen revolution rates (rpms).

While the direction of rotation of the drum screen is not important, the influent material stream is deposited onto the drum screen such that the direction of rotation of the drum screen is counter to the direction of the falling influent material stream when the influent material stream contacts the drum screen.

According to certain further embodiments of the invention, a rotating drum screen system for separating solids from an influent material stream includes a housing having a influent inlet at a influent inlet end, a solid discharge end and an area between the influent inlet end and the solid discharge end, the influent inlet permitting a flow of influent containing solids in a flowing fluid into a hollow portion of a drum screen positioned lengthwise in the area between the influent inlet end and the solid discharge end. The system also includes the drum screen. The drum screen includes a drum frame defining a generally cylindrical volume, a flight or series of flights permanently affixed to the drum frame and extending from an inner surface of the drum screen along a spiral path, the flight or series of flights having a variable height along the drum screen, with a first, lower, height proximate the influent inlet end and a second, higher, height proximate the solid discharge end, the flight or series of flights and the drum frame defining a drum-frame-flight assembly, and a plurality of filter screen sections affixed to an outer surface of the drum-frame-flight assembly. The drum screen is adapted to produce a liquid effluent that is discharged from an outer surface of the drum screen with retained solids being removable from the drum screen via the solid discharge end.

In general (and as mentioned above), some embodiments of the described systems and methods utilize systems and methods for forming stable particles from suspended solids produced by ethanol fermentation. While the described methods can comprise any suitable steps or process, at least in some embodiments, the described methods comprise a method for forming stable particles from suspended solids produced by ethanol fermentation. In some embodiments, such a method comprises one or more optional steps including a fermentation step, an ethanol step, a distillation step, a 190 proof ethanol step, a molecular sieve step, a 200 proof ethanol step, a whole stillage step, a centrifuge step, a wet grains step, a dryer step, a dried grains step, a thin stillage step, and/or a treatment step.

The fermentation step can include any suitable fermentation process including the fermentation of a suitable feedstock. The ethanol step can comprise the resulting ethanol fraction from the fermentation step, together with the fermented and unfermented feedstock solids. The distillation step can comprise one or more distillation steps to isolate ethanol from the feedstock solids. The 190 proof ethanol step can comprise recovering 190 proof ethanol from the distillation step. The molecular sieve step can comprise any suitable methods or process to dehydrate the 190 proof ethanol. The 200 proof ethanol step can comprise recovering 200 proof ethanol from the molecular sieve step. The whole stillage step can comprise recovering the remaining fraction from the distillation step. The centrifuge step can comprise any suitable mechanical separation process for separating a wet grains fraction from a thin stillage fraction. The wet grains step can comprise recovering wet grains, including fermented and unfermented feedstock solids, from the centrifuge step. The dryer step can comprise any suitable method of drying the wet grains. The dried grains step can comprise any suitable step for recovering the dried grains from the drying step. The thin stillage step can comprise any suitable step for recovering a liquid fraction or thin stillage from the centrifuge step. The treatment step can comprise any suitable method for treating the thin stillage to generate and stabilized particles formed from solids and suspended solids.

In some embodiments, stillage can refer to any fraction produced by fermentation. In other embodiments, whole stillage can refer to what is sometimes known in the industry as slops, thick stillage, beer bottoms, spent mash, and/or spent grains. In yet other embodiments, thin stillage can refer to what is sometimes known in the industry as centrate, back set, set back, evaporator feed, slop, and/or solubles. In some embodiments, wet grains can refer to wet cake and/or wet distillers grains (WDG). In some ethanol fermentation embodiments, vinasse can refer to a fraction remaining after fermentation of sugarcane and/or sugar beet such as cane-vinasse or beet-vinasse.

While the treatment step can comprise any suitable steps or process, at least in some embodiments, that treatment step comprises one or more optional steps including without limitation, a pH adjustment step, a reducing agent step, a polymer step, a separation step, a stable particles step, and/or a treated liquid fraction step. The treatment step can be applied to any suitable fraction produced by ethanol fermentation. In some embodiments, the treatment step is applied to whole stillage. In other embodiments, the treatment step is applied to thin stillage. In yet other embodiments, the treatment step is applied to vinasse. In still other embodiments, the treatment step is applied to the applicable solid-liquid material resulting from the applicable fermentation process, however named (e.g., in tequila manufacturing as in rum production, the varying terms most used are: vinasse, spent wash, and dunder). In general, the treatment step can reduce the concentration of total solids and, more specifically, total suspended solids in the treated fraction by forming total suspended solids into stable particles that can be separated from the treated liquid fraction. In some embodiments, the fraction to be treated comprises greater than 5% total solids. In other embodiments, the fraction to be treated comprises greater than 9% to 10% total solids. In yet other embodiments, the fraction to be treated comprises greater than 14% total solids.

In some embodiments, the polymer step comprises any suitable methods, processes, and/or steps to add high molecular weight anionic polymer to the fraction to be treated. The polymer facilitates forming stable particles from the fraction to be treated. The polymer can include any high molecular weight anionic polymer suitable for forming stable particles. For example, the high molecular weight anionic polymer can comprise polymers with a molecular weight greater than 10,000,000 Da. The high molecular weight anionic polymer can comprise polymers with a molecular weight greater than 15,000,000 Da. The high molecular weight anionic polymer can comprise polymers with a molecular weight greater than 20,000,000 Da. In some embodiments, the high molecular weight anionic polymer comprises polymers with a molecular weight between about 16,000,000 and 25,000,000 Da. In some embodiments, the high molecular weight anionic polymer comprises polymers with a molecular weight of about 20,000,000 and 25,000,000 Da. In other embodiments, the high molecular weight anionic polymer comprises polymers with a molecular weight of about 22,000,000 million Da. In general, the high molecular weight anionic polymer is selected to form stable particles and to form particles that can be separated. The high molecular weight anionic polymer can be selected to form particles that can be easily separated by mechanical separation. The high molecular weight anionic polymer can be selected to form particles that facilitate free draining. The high molecular weight anionic polymer can selected from a GRAS polymer. The high molecular weight anionic polymer can selected from a food grade polymer. The high molecular weight anionic polymer can selected from a kosher polymer.

In some embodiments, the high molecular weight anionic polymer is selected from a polyacrylamide. In other embodiments, the level of anionicity is obtained by copolymerization with acrylic acid. In yet other embodiments, the high molecular weight anionic polymer has an anionicity of at least 50 mole percent. In some embodiments, the high molecular weight anionic polymer has an anionicity of at least 60 mole percent. In some embodiments, the high molecular weight anionic polymer has an anionicity of at least 70 mole percent. In some embodiments, the high molecular weight anionic polymer has an anionicity of at least 80 mole percent. In some embodiments, the high molecular weight anionic polymer has an anionicity of at least 90 mole percent. In some embodiments, the high molecular weight anionic polymer has an anionicity of at least 95 mole percent. In other embodiments, the high molecular weight anionic polymer has an anionicity of between 50 and 100 mole percent.

High molecular weight anionic polymers can include any suitable polymers. For example, high molecular weight anionic polymer can include one or more of suitable polymers sourced from Florget (SNF, Inc., Riceboro, Ga., USA). The high molecular weight anionic polymer can include one or more of: AN 956 SH, GR, VHM (VHM=very high molecular charge); AN956 VHM with 50 mole % charge; AN 977 VHM with 70 mole % charge; and/or AN 999 VHM with 100 mole % charge.

Embodiments of the invention discussed herein are more particularly directed toward the separation step to separate the flocculated polymer-solid particles from the more liquid fraction of the thin stillage. Accordingly, any process that creates flocculated particles from the thin stillage may be utilized, including processes that rely on the addition of cationic polymers instead of anionic polymers. The cationic polymer process relies on addition of a silica sol (a stable aqueous dispersion or sol of discrete amorphous silica particles as defined in the article "Silica Sols and Colloidal Silica," Van Nostrand's Scientific Encyclopedia, 2007, available at http://onlinelibrary.wiley.com/doi/10.1002/0471743984.vse9039/abstract).

As discussed herein, the flocculated particles so formed, regardless of the polymer used, tend to be sufficiently fragile so as to limit the recovery by high-energy separation processes. Accordingly, upon addition of the polymer (either anionic or cationic) to the thin stillage, mechanical mixing and/or pumping of the thin stillage is limited. Instead, any further transport of the thin stillage/polymer mixture, after allowing sufficient time for aggregation of the TS/TSS with the polymer in the flocculating step (e.g., fifteen seconds to two minutes), is achieved without mechanical mixing/pumping in a non-shearing manner, such as by gravity feed and the like. Embodiments of the invention receive the thin stillage/polymer mixture as an influent, and provide and efficient system and method for generally separating the flocculated particles from the thin stillage to produce a recoverable more-solid portion and a clarified thin stillage (more-liquid portion) that can be reused as backset or that may be further treated as necessary. The system for separating the more-solid portion from the more-liquid portion of the thin stillage is a rotating drum screen system or rotary drum screen system as illustrated in FIGS. 1-9.

FIG. 1 illustrates an exterior perspective view of an exemplary rotating drum screen system 10 for separating solids from an influent material stream. The system 10 includes a housing 12, which in this example essentially encloses and defines an interior space. In other examples, the housing 12 need not entirely enclose an interior space, but may be essentially open on a side and/or top of the housing 12. The housing 12 includes an influent inlet 14 by which an influent (e.g., thin stillage to which an effective amount of polymer has been added and allowed to bond with solids) may be introduced into the interior space defined by the housing 12. The housing 12 also includes a solid discharge end 16 by which solids separated from the influent may be discharged or removed from the interior space for further processing or disposal. The housing 12 also includes one or more access doors 18 that may permit or facilitate access to one or more locations within the housing 12, such as to monitor function of the system 10 or to permit servicing of the system 10 or its components. The housing 12 further includes a liquid discharge port 20, by which liquid that has been separated from the solids may be discharged or removed from the housing 12 for further processing, discharge, recycling, reuse, or other use.

The system 10 generally receives the influent, separates the influent into liquid and solid portions, and discharges the liquid via a gravity-fed process. Accordingly, the liquid discharge port 20 is located at a lower portion of the housing 12 in the example of FIG. 1. In other examples, once the liquid has been separated from the influent, a pump may be used to pump the separated liquid from the housing, and in such instances the liquid discharge port 20 may be located other than toward a bottom or lower area of the housing 12. While not illustrated in FIG. 1, the liquid discharge port 20 may be operatively attached to discharge piping or some other structure adapted to receive or remove the liquid from the vicinity of the system 10 for further processing, discharge, recycling, reuse, or any other purpose. Similarly, the influent inlet 14 may be operatively attached to inlet piping or other structure adapted to deliver influent to the system 10 for separation of solids from the influent.

The influent inlet 14 is generally disposed at an influent end of the housing 12, or an influent end of the housing 12 is defined by having the influent inlet 14 located there. As discussed, influent enters the housing 12 at the influent inlet 14, or in other words at the influent end of the housing 12. The solid discharge end 16 of the housing 12 is generally located at an opposite end of the housing 12, whereby a generally linear flow path is defined through the housing 12 from the influent end of the housing 12 to the solid discharge end 16 of the housing 12. Solids in the influent generally flow through the housing 12 along this generally linear flow path from the influent end to the solid discharge end 16, being separated from the liquid portion of the influent while within the housing 12. The solids are then discharged or removed from the housing 12 at the solid discharge end 16, and may be taken for further processing or disposal in batches (e.g., via some sort of container or cart) or continuously (e.g., via a conveyor or the like).

Figure 2:
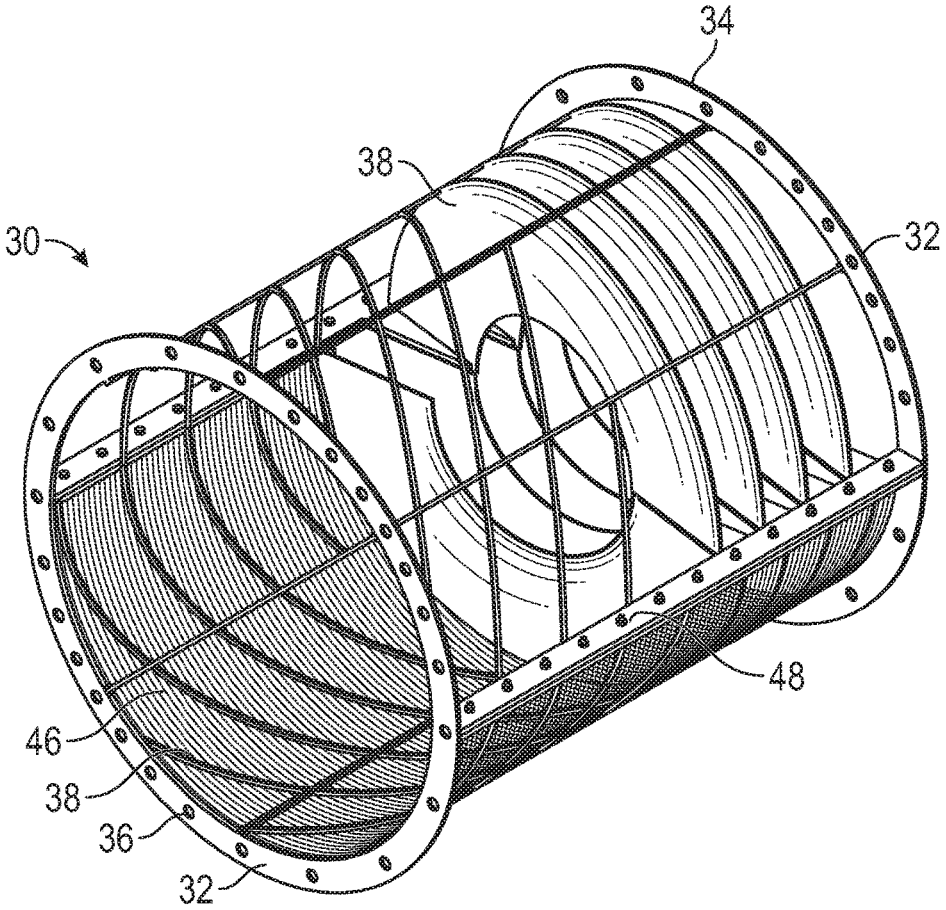
FIG. 2 shows a perspective partially cutaway view of a representative drum screen.

The housing 12 generally contains a drum screen 30 within the interior space defined by the housing 12. FIG. 2 illustrates an illustrative section of a representative drum screen 30. The drum screen 30 is generally cylindrical, and extends within the housing 12 generally from the influent end to the solid discharge end 16. Portions of the housing 12 surrounding the drum screen 30 may represent a liquid capture area adapted to capture liquid passing through the drum screen 30 and to direct liquid so captured to the liquid discharge port 20 or to a pump or other mechanism adapted to remove liquid from the housing 12. At least a portion of a discharge end 34 of the drum screen 30 proximate the solid discharge end 16 of the housing 12 may protrude past the liquid capture area of the housing 12, such that solids discharged or removed from the discharge end 34 of the drum screen 30 do not fall back into the liquid separated from the influent by the drum screen 30.

The drum screen 30 in some embodiments may be formed in sections bolted together at flange 32 disposed at each end of the drum screen section. Forming the drum screen 30 in sections that can be bolted together allows the system to have a drum screen 30 of any desired length/size and capacity (such as being able to receive flows in excess of 500 gallons per minute), without requiring an increase in the gauge of the wire used to form the drum screen 30. Requiring an increased wire gauge would reduce the amount of open space of the drum screen 30 that permits the passage of the liquid portion of the influent, which would reduce efficiency of the system 10. Having the drum screen 30 manufactured in sections, allows it to extend any desired length, and the weight of each section may be separately supported by trunnion bearings placed to support the flange 32. Accordingly, the wire gauge for the drum screen 30 can be maintained as a fine size (such as under forty-seven gauge) to maximize efficiency of the drum screen 30 at permitting passage of liquid therethrough.

Figure 4:
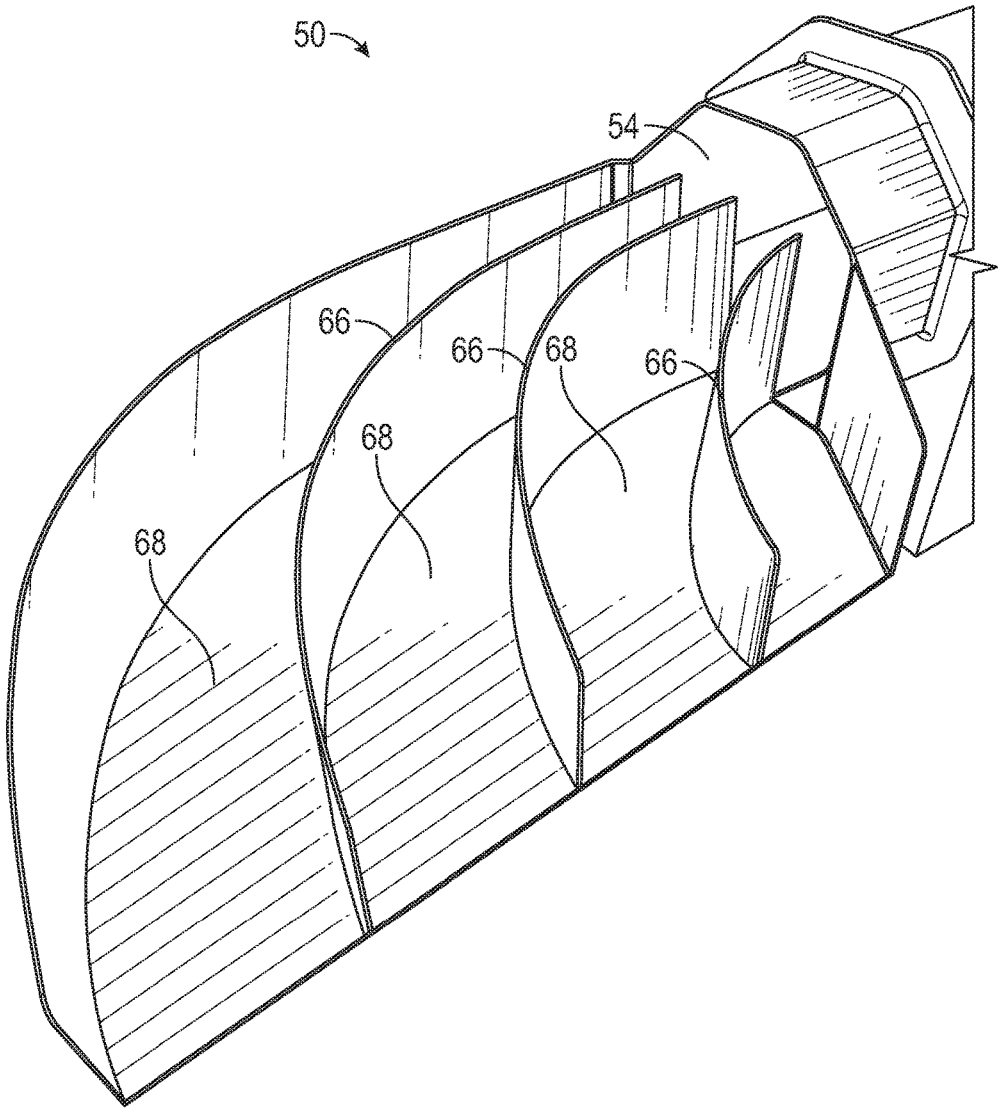
FIG. 4 shows a perspective view of a representative head box.
Figure 5:
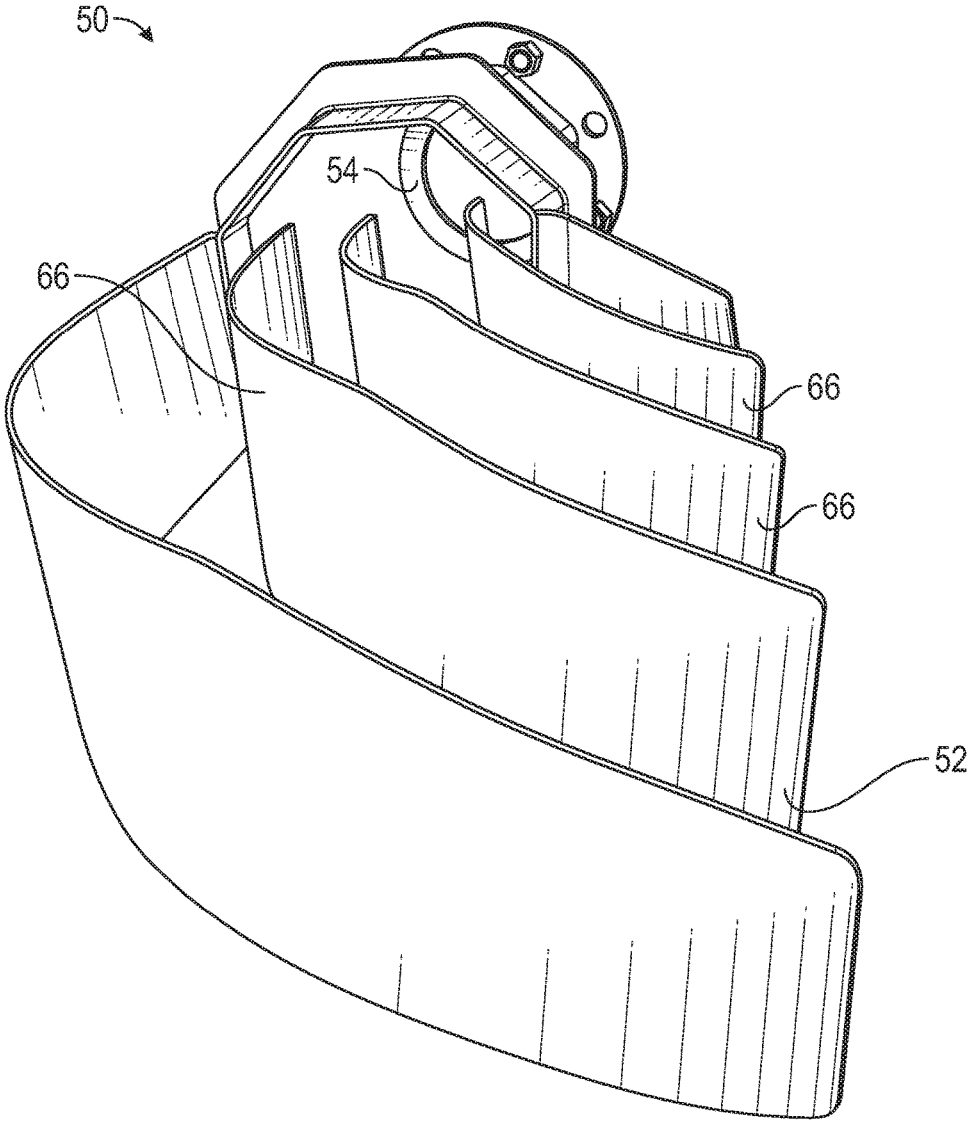
FIG. 5 shows a perspective view of a representative head box.
Figure 6:
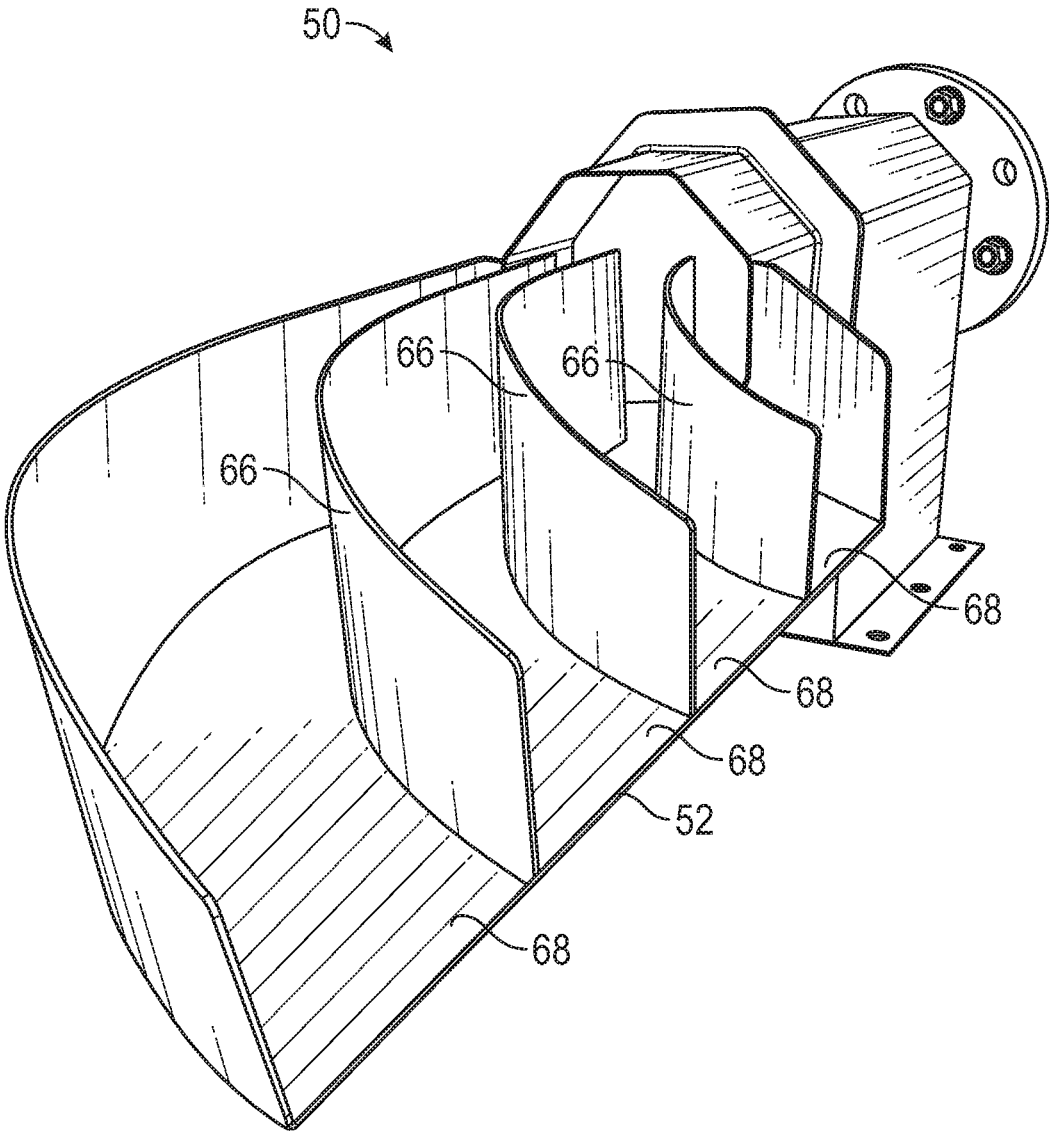
FIG. 6 shows a perspective view of a representative head box.

The drum screen 30 proximate the influent end of the housing 12 may be adapted to minimize or prevent the loss of influent from the drum screen 30 into the liquid capture area of the housing 12. For example, an influent inlet end 36 of the drum screen 30 may be made generally watertight against the housing 12 to prevent loss of influent from the drum screen 30 in the direction of the influent end of the housing 12. Alternatively, the influent inlet end 36 of the drum screen 30 may include or be attached to a raised lip (not shown in FIG. 2) that generally prevents or minimizes flow of influent and/or solids out of the drum screen 30 in the direction of the influent inlet end 36. As another alternative, influent may be directed within the drum screen 30 by a head box 50 (as illustrated in FIGS. 4-6), and the drum screen 30 may be adapted to retain the influent against movement toward the influent end of the housing 12 by rotation of the drum screen 30 around its longitudinal axis and by a flight 38 or series of flights 38 disposed in a generally spiral fashion along on an inner surface of the drum screen 30. The flight 38 or series of flights 38 cause transportation of any materials within the drum screen 30 toward the solid discharge end 16 due to the rotation of the drum screen 30.

Figure 3:
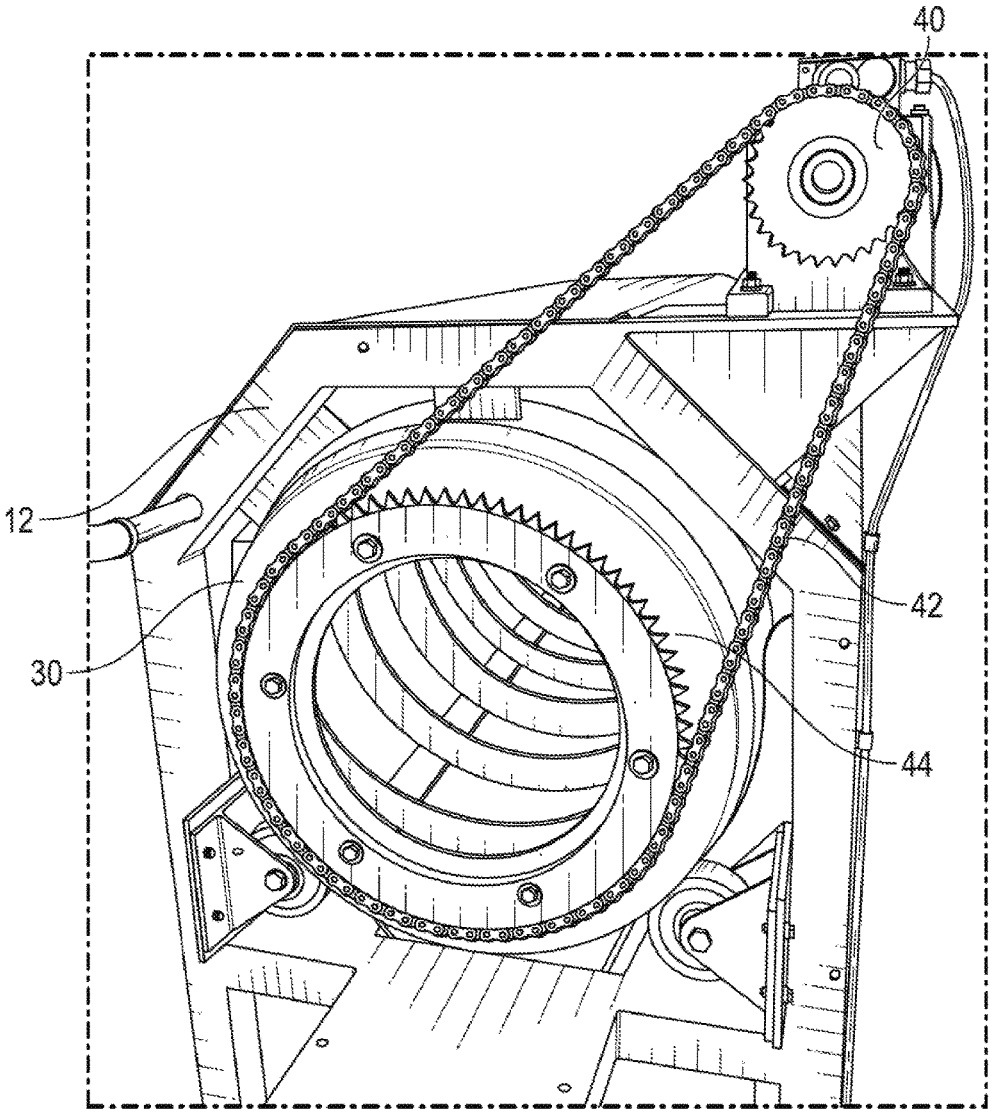
FIG. 3 shows a perspective view of a motor and drive chain for driving a representative drum screen.

Rotation of the drum screen 30 around its longitudinal axis within the housing 12 may be provided, for example, by a motor 40 and drive chain 42, as illustrated in FIG. 3. The drive chain 42 may engage a gear 44 disposed on one end of the drum screen 30 (either at the influent inlet end 36 or at the discharge end 34). The motor 40 may be moisture resistant, and/or it may optionally be located externally to the housing 12 so as to minimize its exposure to water and humidity from the influent and/or separated liquid. When the system 10 is in use, the motor 40 operates continuously to ensure that material within the drum screen 30 is continually moved toward the discharge end 34 of the drum screen 30 by the flight 38 or series of flights 38 and thus out the solid discharge end 16 of the housing 12.

As illustrated in FIG. 2, the flight 38 or series of flights 38 extend generally inwardly from an inner surface of the drum screen 30, but the flight 38 or series of flights 38 do not have a uniform pitch and height. Toward the influent inlet end 36, the flight 38 or series of flights 38 have a generally lower height and a generally higher pitch (distance traveled per revolution of the drum screen 30), while the flight 38 or series of flights 38 toward the discharge end 34 have a generally taller height and a generally lower pitch. The lower height of the flight 38 or series of flights 38 toward the influent inlet end 36 allows influent to be discharged closer to the inner surface of the drum screen 30, thereby minimizing the impact energy of the influent and reducing dissociation of the polymer from the solids, whereby the drum screen 30 retains an increased quantity of polymer-solid aggregate. By way of example, the flight 38 or series of flights 38 may have a height ranging from approximately one-quarter inch to approximately one inch toward the influent inlet end 36. The flight 38 or series of flights 38 may have a height approaching as much as 49% to 50% of the inner-surface-to-inner-surface diameter of the drum screen 30 in some embodiments toward the discharge end 34. In other embodiments, the flight 38 or series of flights 38 has a height selected from any percentage of the inner-surface-to-inner-surface diameter of the drum screen 30 between approximately 25% to approximately 50% toward the discharge end 34.

As illustrated in FIG. 2, the height and pitch of the flight 38 or series of flights 38 may optionally change in pitch and height at a single lengthwise location and all at once, as a discontinuity between a first portion of the flight 38 or series of flights 38 and a second portion of the flight 38 or series of flights 38. In other words, the height and pitch of the flight 38 or series of flights 38 may transition at a single lengthwise location from low and high-pitch to tall and low-pitch. In such embodiments, the lengthwise location of transition will occur at some point toward the discharge end 34 of the location at which the influent is discharged onto the drum screen 30. In some embodiments, the lengthwise location of transition may be immediately toward the discharge end 34 of the location at which the influent is discharged onto the drum screen 30. In other embodiments, the lengthwise location of transition may be at any selected location more toward the discharge end 34. Alternatively (not shown in FIG. 2), the height and pitch of the flight 38 or series of flights 38 may transition gradually from low and high-pitch to high and low-pitch, without any discontinuity between the two states of the flights 38 or series of flights 38.

The higher pitch of the flight 38 or flights 38 toward the influent inlet end 36 helps ensure that influent discharged onto the screen drum 30 is directed toward the discharge end 34 despite the lower height of the flight 38 or flights 38 in this area. Meanwhile, the lower pitch of the flight 38 or series of flights 38 toward the discharge end 34 increases the time that materials are retained on the drum screen 30, thereby maximizing the time for liquids within the influent to be separated from the solid component (e.g., the polymer-solid aggregate) and for such liquids to pass through the surface of the drum screen 30. The increased height of the flight 38 or series of flights 38 toward the discharge end 34 ensures that the material in the drum screen 30 (primarily and increasingly solids such as polymer-solid aggregate as the material moves toward the discharge end 34) does not bypass spaces between the flights 38 or series of flights 38 (in other words, does not flow over any flight 38), allowing sufficient time for liquid-solid separation. The increased height of the flight 38 or series of flights 38 also ensures eventual discharge of the separated solids out the solid discharge end 34.

The flight 38 or series of flights 38 may have any desired cross-sectional profile. In some embodiments, the flight 38 or series of flights 38 has a generally even cross-sectional profile, with the base of the flight 38 or series of flights 38 being approximately equal in thickness to the top of the flight 38 or series of flights 38. In other embodiments, the flight 38 or series of flights 38 has a broader base where it engages the inner surface of the drum screen 30 and a narrower top away from the drum screen 36 (potentially a generally triangular profile). The cross-sectional profile of the flights 38 may vary from the influent inlet end 36 to the discharge end 34 of the drum screen 30 as well. Embodiments of the invention embrace flights 38 of any cross-sectional profile.

As discussed, the flight 38 or series of flights 38 extend from an inner surface of the drum screen 30. The inner surface of the drum screen 30 (between the flight 38 or series of flights 38) is formed of sections of filter screen 46. Each section of filter screen 46 may extend around a portion of the drum screen 30, such as around 90°, 120°, or 180° of the drum screen 30. The filter screen 46 may be a wedge wire screen formed of a plurality of parallel spaced wedge wires disposed on spaced support beams or rods. Wedge wire screens are strong, low clogging, and easy to clean, and are well adapted to separation of liquids and solids. The wedge wire used in the filter screen 46 may have varying profiles, but are generally formed of stainless steel, such as SAE 316 stainless steel (also known as marine grade stainless steel) or SAE 304 stainless steel. Wedge wire screens have three variables that control the rate at which liquids are separated and pass through the screen surface, leaving solids on the surface. The first is the thickness of the wire used to create the screen surface. The second is the gap between the wires. The third is the tip angle, which is the angle at which the leading edge of the wire is oriented from horizontal. Depending on the variables of wire thickness and gap distance between each wire, the screen has a free drainage area defined as the amount of open space per unit area of the screen.

Embodiments of the invention embrace use of a broad range of filter screens 44 having a variety of characteristics relating to these three variables. Certain embodiments of filter screens 44 for use in separation of aggregated solids from thin stillage have wire diameters between #20 wire and #47 wire to facilitate the solid capture rate. Some embodiments of filter screens 44 for use in separation of solids from thin stillage have a gap space between the wedge wires of between approximately 0.001 inches and approximately 0.024 inches to facilitate aggregated solid capture. In some embodiments, a tip angle of between approximately 2° and approximately 8° facilitates solid capture. The filter screen 46 in the example of FIG. 2 is oriented within the drum screen 30 so as to create shear in the influent deposited on the filter screen 46; the wedge wires accordingly run approximately parallel to the rotational axis of the drum screen 30.

The sections of filter screen 46 are attached to a drum frame 48 of the drum screen 30. The drum frame 48 may have any number of frame members that generally define the shape of the drum screen 30 and provide support for the sections of filter screen 46 and the flight 38 or series of flights 38. In traditional drum screens, the flights that move material within the drum screen are generally welded to the frame of the drum screen. In embodiments of the drum screen 30, such as shown in FIG. 2, however, the flight 38 or series of flights 38 are formed in sections that are welded or similarly permanently attached to the individual sections of filter screen 46, such that the sections of filter screen 46 can be removed, with their attached sections of flight 38, from the drum frame 48. Thus, individual sections of filter screen 46 and attached flight 38 may be removed and replaced as necessary for purposes such as repair, replacement, or cleaning. For purposes of this application, the term "permanently" when used in reference to the attachment between the sections of flight 38 and the sections of filter screen 46 is intended to refer to welding or similar means of attachment that is not readily reversible by operation of conventional tools. In contrast, the filter-screen-flight sections are reversibly attached to the drum frame 48. The term "reversibly" when used in reference to the attachment between the filter-screen-flight sections and the drum frame 48 is intended to refer to bolting of the sections to the drum frame 48 or other similar means of attachment (e.g., screwing, riveting, etc.) that can be reasonably readily reversible such that detachment can be effectuated on-site with reasonable tool use. Accordingly, if necessary, the interior of the housing 12 may be accessed using one or more of the access doors 18, then the interior of the drum screen 30 may be accessed by removing one or more sections of filter screen 46 (with its attached sections(s) of flight 38) from the drum frame 48.

In such a fashion, the interior of the drum screen 30 may be accessed and serviced without either completely disassembling the rotary drum screen system 10 (or at least without removing the drum screen 30 from the housing 12) and without requiring access to the interior of the drum screen 30 from the discharge end 34. As the flights 38 in some embodiments of the drum screen extend as much as approximately half the inner-surface-to-inner-surface diameter of the drum screen 30 in any event, access to the interior of the drum screen 30 from the discharge end 34 would be difficult in any event.

While embodiments of the system 10 permit access to the interior of the drum screen 30 by removal of one or more sections of the filter screen 46, and while such access may permit cleaning of the drum screen 30, embodiments of the system 10 include systems that facilitate operational cleaning of the drum screen 30 and particularly of the filter screen 46 while the drum screen 30 is in place and even in use. A clean-in-place system utilizes clean fluid applied to the back (outside) of the filter screen 46 so as to help clean the screen. As the system 10 is intended to dewater the solids in the influent (e.g., thin stillage), the fluid utilized by the clean-in-place system may be clean dry air so as to permit cleaning without adding water to the process. Alternatively, if air alone is insufficient to achieve a desired amount of cleaning, a small amount of water may be added to the air flow to increase the cleaning capacity of the air. Further, the clean-in-place system may be adapted to utilize water as the cleaning fluid from time-to-time.

The clean-in-place system includes a set of nozzles disposed within the housing 12 and external to the drum screen 30, such as within a top half of the housing 12, and along the length of the drum screen 30 such that the entire length of the drum screen 30 is exposed to the output of at least one nozzle. The nozzles are aimed toward the drum screen 30. The nozzles may operate together, as groups, or individually. As one example, all nozzles receive and apply cleaning fluid (air, air/water mix, or water, etc.) simultaneously. As another example, a first group of cleaning nozzles, such as a group of nozzles more proximate the influent inlet end 36, receive and apply cleaning fluid separately and independently from a second group of cleaning nozzles, such as a group of nozzles more proximate the discharge end 34. As another example, three or more zones of nozzles operate independently. When there is more than one group of nozzles operating independently, the flow of cleaning fluid through each group may be optimized to facilitate cleaning of a section of the drum screen 30 proximate such group of nozzles.

As one particular example, the nozzles of the clean-in-place system are functionally grouped into two groups, one group functionally placed so as to clean a portion of the drum screen associated with the lower-height flights 38. This portion of the drum screen 30 is associated with a head box delivering the influent to the interior of the drum screen 30 as is discussed in more detail below. Accordingly, the first group of nozzles of the clean-in-place system is functionally associated with cleaning a portion of the drum screen 30 adapted to initially receive the influent. The material on this portion of the drum screen 30 will generally have a higher liquid/water content as this portion of the drum screen 30 receives material before significant solid-liquid separation has occurred. A second group of the nozzles of the clean-in-place system is functionally placed so as to clean a portion of the drum screen associated with the higher-height flights 38. As the material on this portion of the drum screen 30 has been retained within the drum screen 30 for a longer time, more of the liquid has been separated out, so the material has a lower water/liquid content. As may be appreciated, different portions of the drum screen 30 contain materials of different liquid compositions, and accordingly different cleaning practices may be called for.

For example, the clean-in-place system may operate the different groups of cleaning nozzles differently. One group of nozzles may utilize less cleaning fluid (air, air-water mixture, etc.), or may utilize a gentler pressure when applying the cleaning fluid. The clean-in-place system may operate each group of nozzles continuously or intermittently, as occasion demands. Each section of the clean-in-place system may have its own water mixing valve and control valve such that any combination of air, air and water, or water only can be applied to the associated section of the drum screen 30. Accordingly, the clean-in-place system may be operated at any time when the system 10 is in use, including when the system 10 is in continuous use, so as to ensure that the drum screen 30 remains sufficiently clean to permit passage of liquid through the spaces between the wedge wires of the sections of filter screen 46.

Additionally, in some embodiments, the clean-in-place system may include one or more additional nozzles within the drum screen 30, and more particularly within the head box inside the drum screen 30. Such nozzles may permit high-flow cleaning of the head box from time to time, and particularly when the system 10 is to be shut down. Such high-flow cleaning may ensure that no influent remains in the head box to dry out and clog the head box before resumption of operation of the system 10.

The clean-in-place system may aid in keeping the sections of filter screen 46 clean, but to further assist in keeping the sections of filter screen 46 clean and to further enhance the separation of solids and oils from the water component of the influent, the sections of filter screen 46 may be modified from traditional wedge wire screens. As discussed previously, the wedge wire screens may be formed of marine grade stainless steel or SAE 304 stainless steel. Unfortunately, bare stainless steel has a surface charge that decreases the screen's efficiency in separating liquids and solids. Accordingly, to increase efficiency of separation, the surface of the sections of filter screen 46 may be modified with a nonstick coating that enhances liquid-solid separation and also aids in keeping the sections of filter screen 46 clean, thereby increasing the efficiency of the clean-in-place system.

To cause aggregation of the solids within the influent (e.g., thin stillage), one or more polymers is added to the influent and allowed to react prior to the influent being fed to the system 10. A variety of polymers have been disclosed and used to separate solids from the liquid component of the thin stillage, but typical polymers are anionic or cationic. The polymers may have a variety of molecular weights and associated intrinsic viscosity, charges (dl/g), and viscosity (cP). To improve the function of the filter screen 46 at retaining solids and enhancing flow through the filter screen 46, a fluorocarbon nonstick coating is applied to the filter screen 46 to modify the polarity of the surface of the filter screen 46 to make the surface both hydrophobic and oleophobic/lipophobic. Use of such coatings improves solids capture as well as capture of oils present in the influent.

The coating applied to the filter screen 46 may be one of a variety of fluorocarbons such as polytetrafluoroethylene (PTFE), polyvinylidene fluoride (PVDF), fluorinated ethylene propylene (FEP), perfluoroalkoxy alkanes (PFA), or ethylene tetrafluoroethylene (ETFE). These fluorocarbons can be used as surface that is both hydrophobic and lipophobic, thereby increasing the solids formed and separated from the liquid of the influent and also increasing the oil content of the solids removed from the liquid. The coating changes the polarity and therefore the physical interface between the liquids and the solids of the influent. The solid-oil mixture so separated and retained in the drum screen 30 is essentially equivalent to syrup but without requiring the traditional evaporation process, or to the extent the separated solid-oil mixture still retains more water than traditional syrup, the remaining water can be removed with only minimal additional evaporation (thus requiring less energy input for heating). The coating applied to the surface has a higher coefficient of dynamic friction, particularly the FEP coating. The result is a significant change in the polarity of the stainless steel from hydrophilic and slightly lipophilic to hydrophobic and lipophobic. The angle of contact of water ($\theta_c$) on PTFE surfaces has been measured at 110°, assisting in the separation of liquids from solids and facilitating passage of liquid through the filter screen 46. By way of example, an uncoated stainless steel screen having a through flow of between 12 to 15 gallons of water per minute per square foot may have a through flow of 24 to 30 gallons per minute per square foot with no loss of solids or oil capture.

As a result of the coating of the filter screen 46, the percent solids recovery of the drum screen 30 is improved by approximately 20% to approximately 23% percent, from 16%-18% solids (dry weight basis) to 21%-23% percent solids (dry weight basis). On a small scale of 30 to 40 gallons per minute (gpm), the increase in the oil recovery has increased from the typical 74% to 82% recovery in a fuel ethanol plant to 80% to 88% recovery, a 6% to 8% increase in the recovery of oil in the resultant syrup equivalent. The oil is easily extractable by non-chemical means or surfactants. Nevertheless, the addition of a surfactant such as sodium dodecyl sulfate (SDS) or sodium lauryl sulfate at a point prior to addition of the polymer to the thin stillage would improve oil recovery even more.

As discussed herein, the force at which the flocculated particles formed of polymer and aggregated TS/TSS and other materials contacts the screen should be minimized so as to minimize dissociation of the aggregated materials from the polymer. Otherwise, the recovery of the TS/TSS and other materials is limited. Accordingly, the system 10 further includes a head box 50 (shown in FIGS. 4-6) that is disposed within the housing 12 and within the interior defined by the drum screen 30 in a location intended to deposit the flow of influent onto the drum screen 30 (and more particularly onto the filter screen 46 with minimal impact energy. One way in which the impact energy is minimized is by positioning a discharge 52 of the head box 50 at a location within the drum screen 30 so as to minimize the distance the influent flows after leaving the discharge 52 before impacting the filter screen 46. This is achieved, in part, by way of the lower height of the portion of the flight 38 or series of flights 38 at locations of the drum screen 30 proximate the head box 50, as discussed previously.

Figure 7:
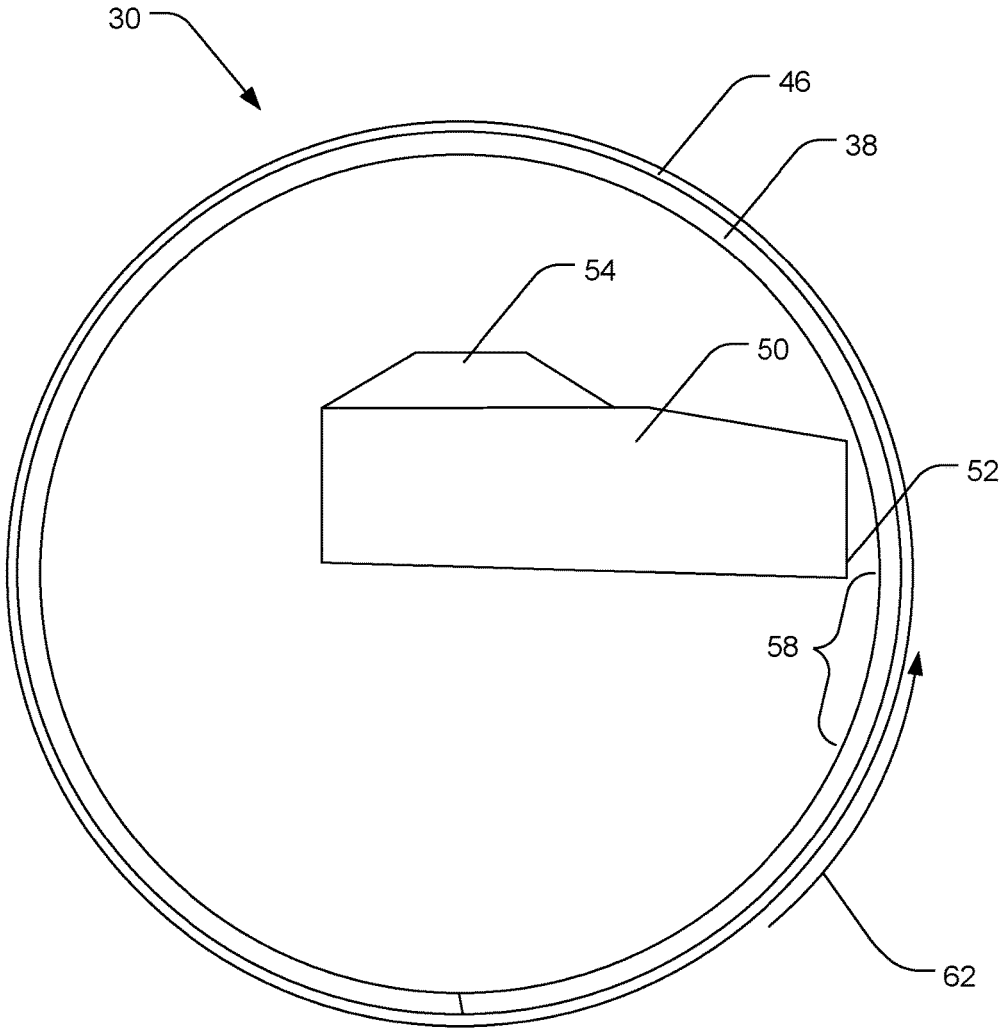
FIG. 7 shows an end view depicting placement of a representative head box within a representative drum screen.
Figure 8:
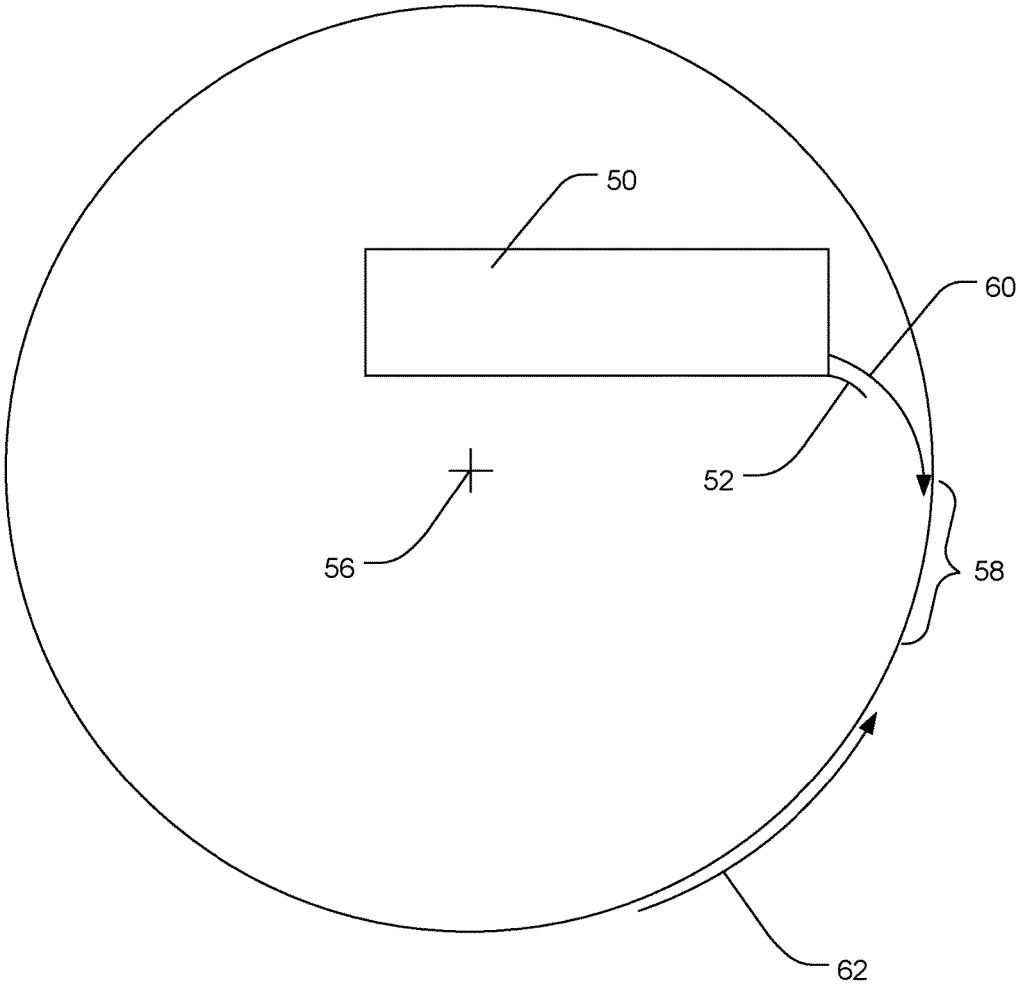
FIG. 8 shows another end view depicting placement of a representative head box within a representative drum screen.
Figure 9:
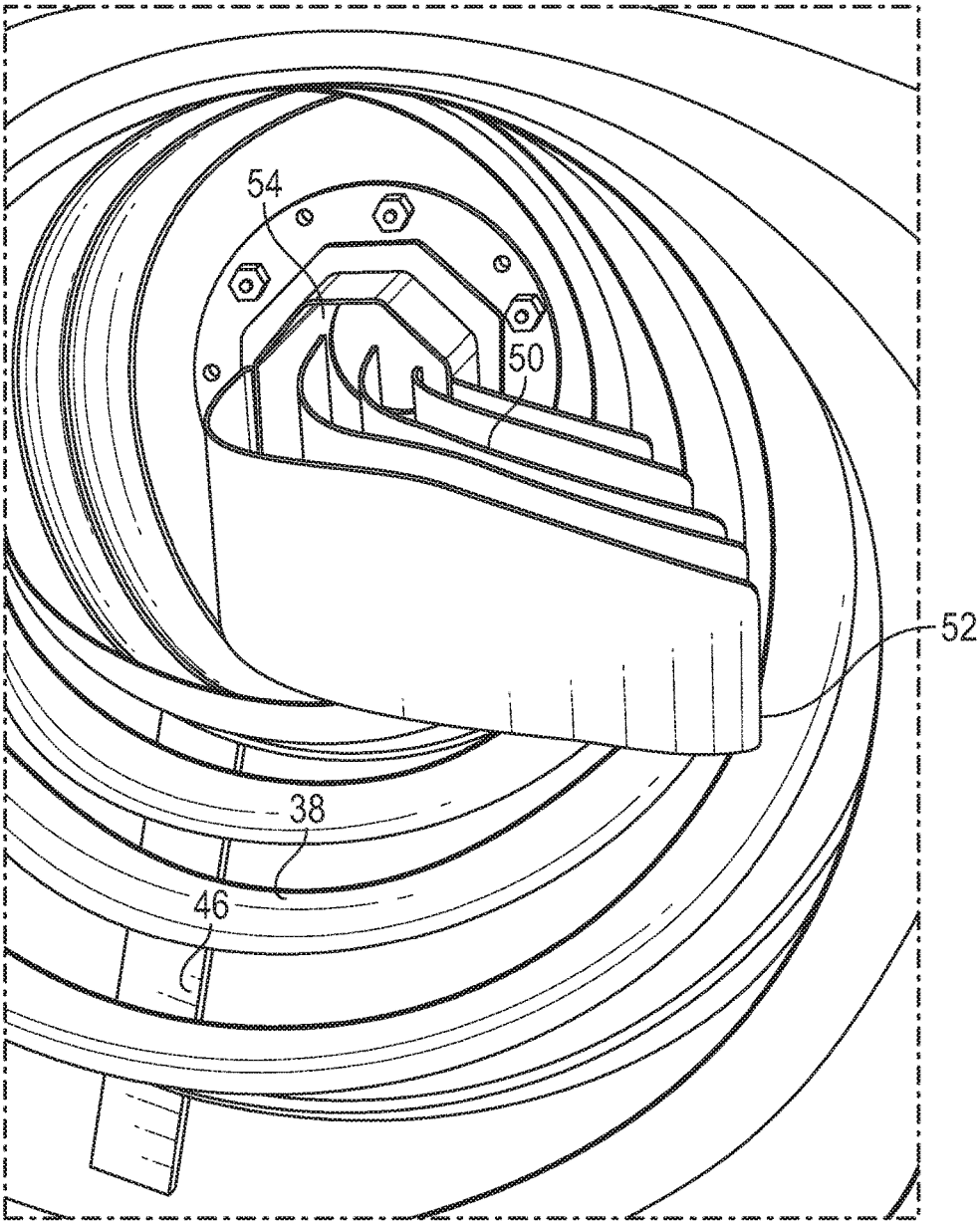
FIG. 9 shows a perspective view of a representative head box in a representative drum screen.

Because the height of the flight 38 or series of flights 38 is low in this area, the discharge 52 of the head box 52 can be positioned proximate the surface of the drum screen 30 provided by the sections of filter screen 46. Accordingly, there is less distance traveled by the influent once it leaves the discharge 52 of the head box 50. The positioning of the head box 50 within the drum screen 30 to achieve this minimal influent travel distance is illustrated in FIGS. 7-9. As is best illustrated in FIGS. 7 and 8, the head box 50, its discharge 52, and particularly an inlet 54 of the head box 50 may optionally be positioned above a center 56 of the drum screen 30. This upward positioning allows the influent to flow generally downward from the inlet 54 while still allowing the influent to leave the discharge 52 of the head box 50 near the side of the drum screen 30. Accordingly, the influent leaves the discharge 52 at a point near which the wall of the drum screen 30 is more nearly vertical than horizontal. In this fashion, when the influent leaves the head box 50 flowing generally outward and begins to fall down from the discharge 52, there is not a significant perpendicular component of the flow of influent 50 as it strikes the filter screen 46 at an area of impact 58. Instead, the influent is flowing nearly parallel to the effective surface of the filter screen 46 when it impacts the filter screen 46. The area of impact 58 may encompass an area (seen in FIG. 7) of between approximately 90° and approximately 120° around the drum screen 30 from the uppermost point of the drum screen 30. In some embodiments, the flow of influent contacts the filter screen 46 at a point at or near approximately 110° around the drum screen 30 from the uppermost point of the drum screen 30. In some embodiments, the flow of influent contacts the filter screen 46 at a point at or near approximately 114°+/−15° around the drum screen 30 from the uppermost point of the drum screen 30.

Because a flow 60 (see FIG. 8) of influent from the head box 50 at the area of impact 58 is approximately parallel to the effective surface of the filter screen 46, the impact energy applied to the incoming influent is minimized, thereby minimizing the disruption of the flocculated particles of polymer/solids. Meanwhile, the drum screen 30 is rotated in the direction of the arrow 62. Accordingly, the drum screen 30 rotates in a direction generally counter to the flow of incoming influent, thereby maximizing the greatest amount of differential between the direction of flow of the incoming influent and the direction of movement of the filter screen 46, which may facilitate the initial flow of liquid through the filter screen 46, improving the initial solid-liquid separation as the influent contacts the filter screen 46. Increasing the speed of rotation of the drum screen 30 may increase the total capacity of the system 10. Accordingly, the impact energy of the stream of influent impacting the filter screen 46 is minimized, and good initial solid-liquid separation is still achieved without disruption of the polymer-solid aggregate material.

The head box 50 is further designed to ensure that the influent is substantially evenly distributed onto the drum screen 30. In general, as the influent enters the system 10 through the inlet 54, it is flowing along the longitudinal axis of the drum screen 30 (i.e., generally normal to or out of the page of FIG. 7). To minimize the impact energy of the influent and to maximize the surface upon which the influent transitions to the filter screen 46, such incoming flow is redirected to be generally perpendicular to the longitudinal axis of the drum screen 30 (i.e., generally to the right (or alternatively left) of the page of FIG. 7). If such flow were not spread more-or-less evenly, areas of the filter screen 46 that received more flow of influent might suffer from overload such that the rotary drum screen system 10 would be less efficient at solid-liquid separation than might otherwise be achieved. Accordingly, the head box 50 is designed to spread and equalize the flow of influent from the head box 50 to the drum screen 30.

At the inlet 54, the head box 50 has a flat bottom that is generally level from left to right as seen in FIG. 7. Additionally, the inlet 54 may be larger than a pipe supplying the system 10, such that the speed of flow of the incoming influent slows down at the head box 50 to further minimize the kinetic energy of the influent. The wide, flat bottom of the inlet 54 causes the influent to enter the head box 50 already roughly evenly distributed across the head box 50. At a point along the flow path in the head box 50 at or after the inlet 54, the flow path is divided by a plurality of fluid flow channel dividers 66 (three in the embodiment illustrated in FIGS. 4-6) that divide the flow of influent into a plurality of ongoing streams of influent, with one more ongoing stream than the number of fluid flow channel dividers 66. In some embodiments, a plurality of flow regulators, such as adjustable barriers or dams, or other adjustment mechanisms modifying the spacing or height of an inlet end of the respective fluid flow channel dividers 66 may be utilized to further ensure that each of the ongoing streams of influent is substantially equal. The flow regulators may be individually incorporated into each fluid flow channel 68 created by the fluid flow channel dividers 66. Accordingly, there may be as many flow regulators as there are fluid flow channels 68.

The fluid flow channel dividers 66 serve an additional purpose beyond dividing the flow of influent into the ongoing streams. The fluid flow channel dividers 66 also serve to redirect the incoming flow of influent from parallel to the rotational axis of the drum screen 30 to approximately perpendicular to the rotational axis of the drum screen 30. This is achieved by the gradual curve of the fluid flow channel dividers 66, which redirects the influent without overly agitating the influent or causing dissociation of the solids from the polymer.

As may be understood from reference to FIGS. 4-6, the design of the head box 50 causes the flow 60 of influent leaving the discharge 52 to be generally even and laminar. In some embodiments, the laminar flow 60 may have a depth of between approximately 0.02 inches (0.05 cm) and approximately 1.6 inches (4.0 cm). The distance from the discharge 52 to the filter screen 46 generally falls within the range of approximately one half inch to approximately five inches, depending on the overall flow rate of the system 10. The width of the discharge 52 may vary from approximately one tenth the total length of the drum screen 30 to approximately one half the total length of the drum screen 30.

The head box 50 may be designed to be self-cleaning. In other words, the head box 50 is designed to prevent unwanted retention of influent upon shutdown of the system 10. Instead the entire floor of the head box 50 is gently sloped to the discharge 52, such that upon shutdown of the system 10, any remaining influent in the head box 50 simply drains out the discharge 52 into the drum screen 30, minimizing the chance that influent will remain and dry in the head box 50. This self-draining feature minimizes the risk that the head box 50 will become clogged with dry influent after a period of use. The self-draining feature also helps ensure that influent continues to flow even while in use: if the head box 50 has low points that do not self-drain, such locations act as a possible point where solids can accumulate to clog the system 10. Additionally, as discussed previously, the head box 50 may include a water cleaning nozzle as part of the clean-in-place system, which water cleaning nozzle may be used upon shutdown or at other applicable times to ensure the head box 50 remains clear of accumulated solids that might block or disrupt flow through the head box 50 or its fluid flow channels 68.

Embodiments of the system 10 may be scaled to various requirements, such as influent flow rates approaching and exceeding 1000 gpm. Embodiments of the system 10 may result in increased capture of oil from the separating process of at least 4% (e.g., from a range of 74% to 82% recovery to a range of 80% to 88% recovery). Additionally, embodiments of the system 10 permit increased separation of solids in the form of TSS and TS of at least 5%. Embodiments of the invention also provide improved bioavailability of the recovered oils and solids as the recovered oil and solids are not put through a traditional evaporative process, but may instead be taken from the more-solid portion (syrup) discharged through the discharge end 34 of the system 10. Addition of a surfactant such as SDS ahead of the polymer application step may further improve oil capture as much as 4% or more. Because of the efficiency of the system 10, the anionic polymer used in the system 10 may be applied at a lower dose, as low as less than 20 mg/L of influent solids at between 7% and 8% solids by weight. Sodium metabisulfite may be used as a particle stabilizer in the influent thin stillage. Embodiments of the invention also provide improved dewatering of the solid from the rotating drum screen 30, such as at least 5% improvement.

The drum screen 30 may be sized to perform the desired separation of solids from liquids. The area of the drum screen 30 between approximately 120° and approximately 180° from the top (uppermost point) of the drum screen 30 is the working area of the drum screen 30. The length of the head box 50 is determined by computing the length necessary to take the expected incoming influent volume rate and to reduce the depth of that volume of influent so that it is between approximately 0.02 inches (0.05 cm) and approximately 1.6 inches (4.0 cm) as it comes into contact with the filter screen 46. The size of the drum screen 30 is customized by reviewing the circumference and rotations or revolutions per minute (rpm) of the drum screen 30 to determine the working area of the drum screen 30 for a given amount of time, and how much influent will flow through the head box 50 at the desired depth. In some embodiments, the drum screen 30 may revolve at a rate of between approximately 4 rpm and approximately 25 rpm. In other embodiments, the drum screen 30 may revolve at a rate of between approximately 4 rpm and approximately 50 rpm. Higher rpms provide more surface area of filter screen for passage of liquid, solid accumulation, and solid removal. Accordingly, systems with higher flow and/or higher solids for removal may incorporate higher drum screen revolution rates (rpms).

Figure 10:
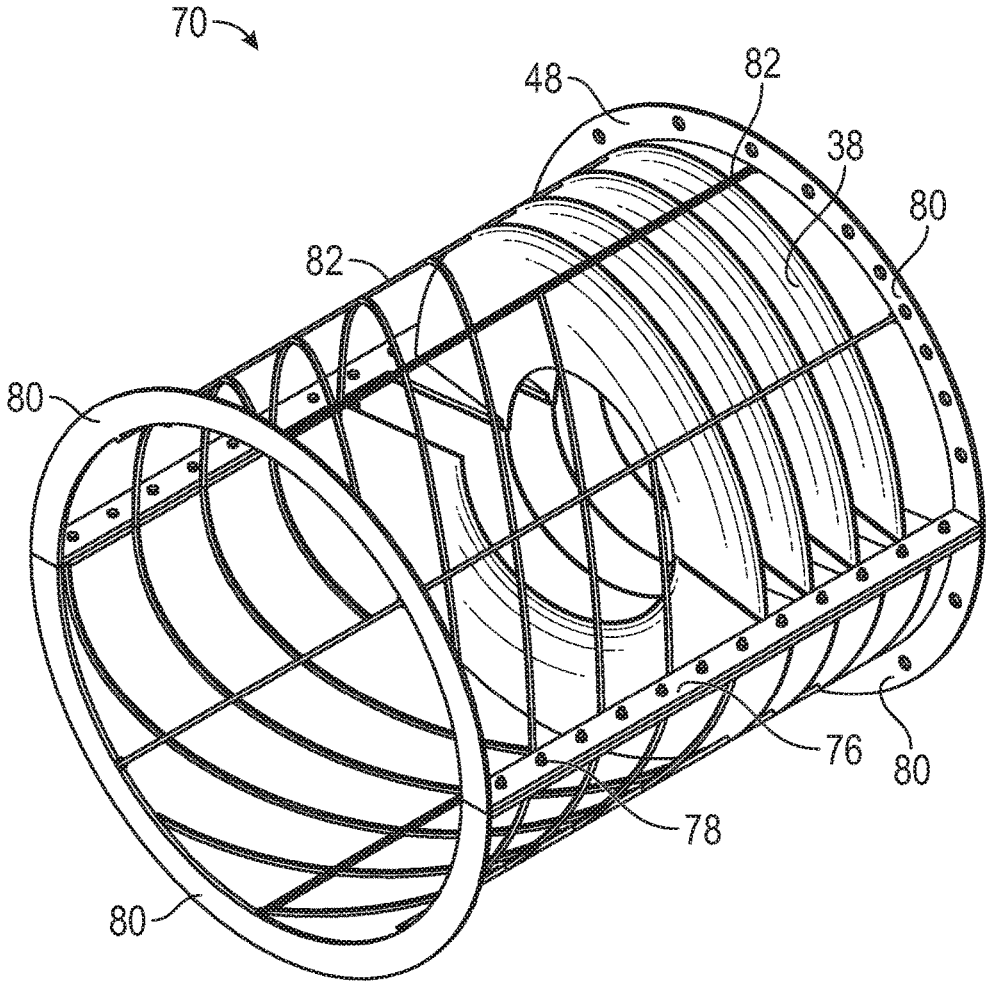
FIG. 10 shows a perspective view of a representative drum-frame-flight assembly.
Figure 11:
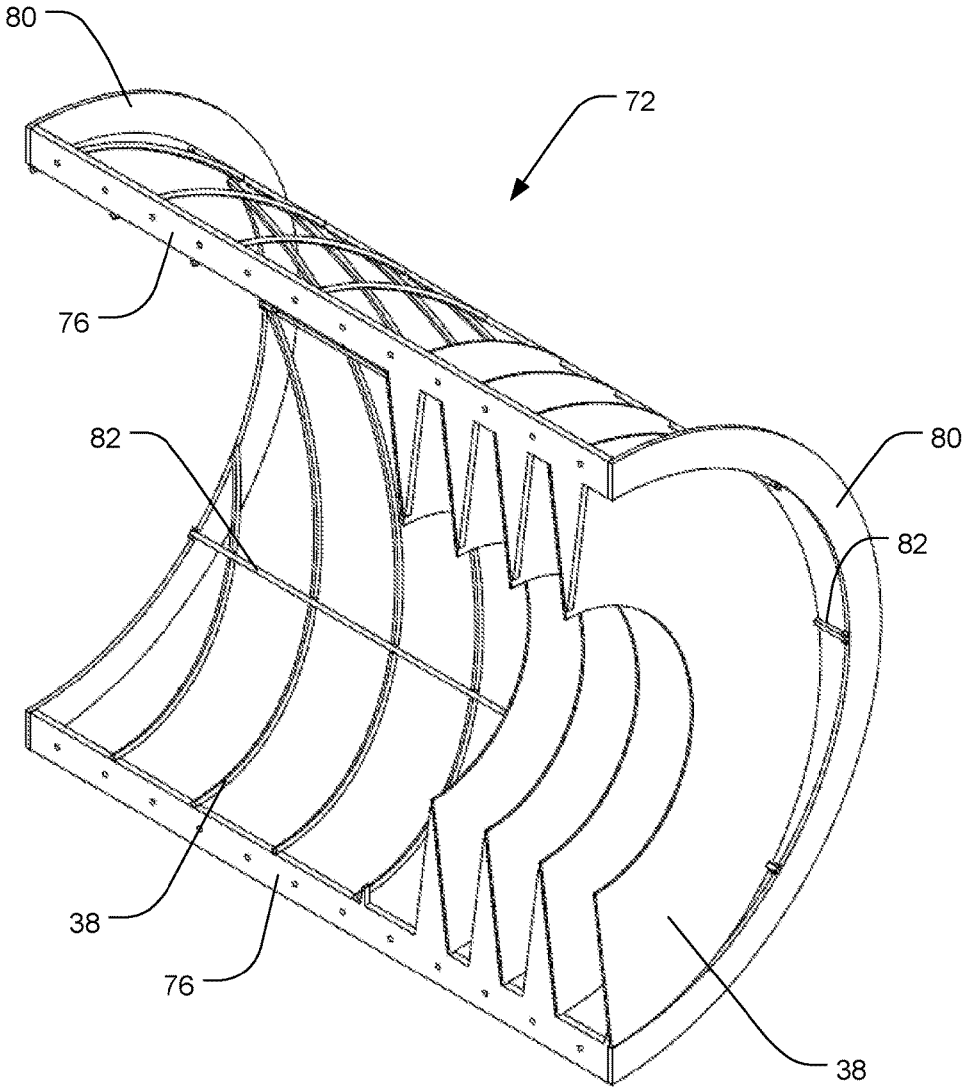
FIG. 11 shows a perspective view of a first section of the representative drum-frame-flight assembly of FIG. 10.
Figure 12:
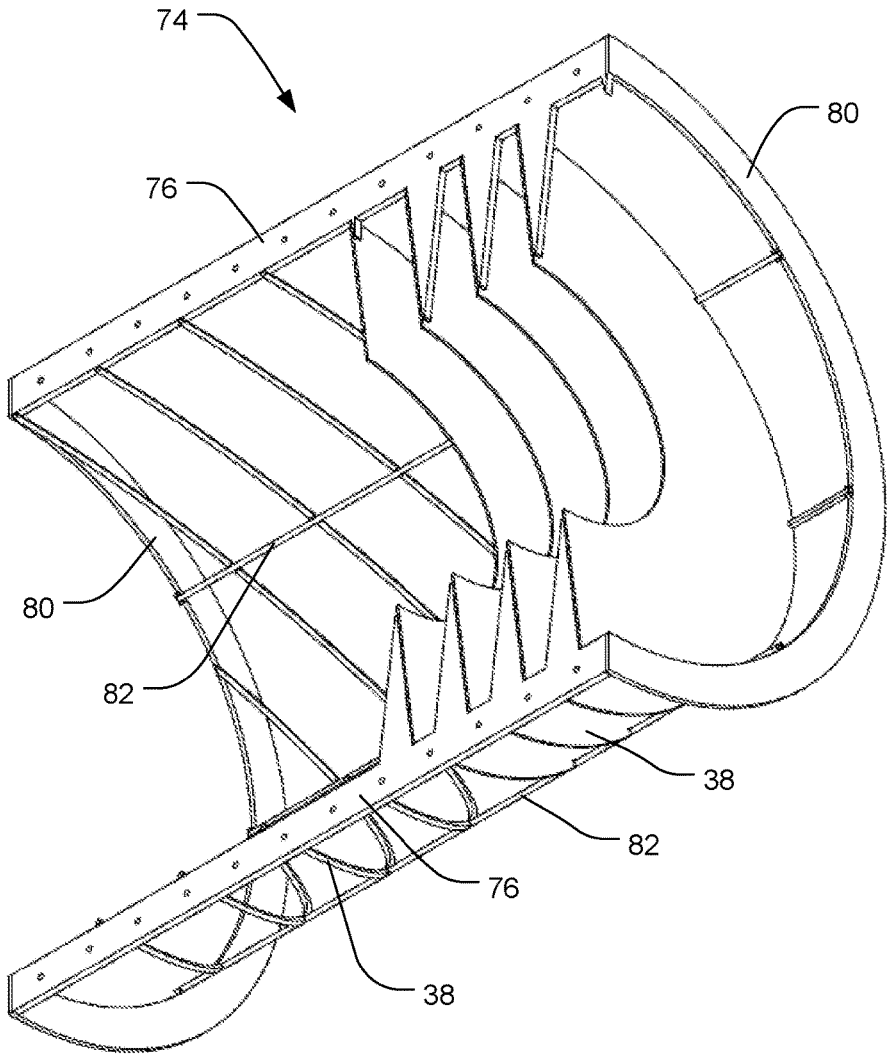
FIG. 12 shows a perspective view of a second section of the representative drum-frame-flight assembly of FIG. 10.

FIGS. 10-19 illustrate features of another representative drum screen 30 in accordance with embodiments of the invention. FIG. 10 shows a perspective view of a drum-frame-flight assembly 70 of the drum screen 30. The drum-frame-flight assembly is formed of the various components of the drum frame 48, which drum frame 48 defines a generally cylindrical volume, as well as the flights 38 or series of flights 38, which are affixed to the drum frame 48. In this embodiment, the drum frame 48 or drum screen 30 is formed of two halves or sections, a first section 72 (illustrated in more detail in FIGS. 11 and 13) and a second section 74 (illustrated in more detail in FIGS. 12 and 14). The drum frame 48 of each section 72, 74, includes a bolting bar 76 adapted to receive bolts 78 to secure the first section 72 to the second section 74. The drum frame 48 of each section 72, 74 also includes a flange portion 80 at each end thereof adapted to perform one or more of various functions. The flange portion 80 of one or both ends of each section 72, 74 may be bolted or otherwise secured to a drive element such as gear 44 to permit the drum screen 30 to be rotationally driven (see, e.g., FIG. 3). Additionally, the flange portion 80 of one or both ends of each section 72, 74 may be received by a trunnion bearing or other load-supporting element adapted to permit rotation of the drum screen 30. Furthermore, the flange portion 80 of one or both ends of each section 72, 74 may be bolted or otherwise secured to a respective flange portion 80 of another section of drum screen 30 to form a longer drum screen 30.

The drum screen 30 represented by the drum-frame-flight assembly 70 of FIG. 10 represents one possible format for the drum screen 30, in which the heights and pitches of the flight 38 or series of flights 38 vary within the individual section of drum screen 30. In other embodiments, however, the flight 38 or series of flights 38 may vary from section to section of the drum screen 30. In other words, the flight 38 or series of flights 38 may have one pitch and height in one section of the drum screen 30, and the flight 38 or series of flights 38 may have a second pitch and height in a next section of the drum screen 30 secured to the first section of the drum screen 30 at the respective flange portions 80. Where the drum screen 30 is formed of two sections of drum screen 30 secured to each other at respective flange portions 80, each section may have a single height and pitch of the flight 38 or series of flights 38 (but differing from each other), or one section may have a single height and pitch of the flight 38 or series of flights 38, while the other section may have a portion of the flight 38 or series of flights 38 with a height and pitch matching that of the other section of the drum screen 30 and with the other portion of the flight 38 or series of flights 38 being different. Similarly, the distribution of heights and pitches of the flight 38 or series of flights 38 may vary from section to section when the drum screen 30 is formed of three or more sections. In all such instances, the height of the flight 38 or series of flights 38 may be lower proximate the head box 50 and the pitch of the flight 38 or series of flights 38 may be higher proximate the head box 50, while the height of the flight 38 or series of flights 38 may be higher in the remaining portion of the drum screen 30 and the pitch of the flight 38 or series of flights 38 may be lower in that portion of the drum screen 30. Accordingly, the drum-frame-flight assembly 70 of FIG. 10 is intended to illustrate features of a single embodiment of the drum screen 30, and it will be understood that the features illustrated in FIG. 10 can be distributed among the various sections of the drum screen 30 when the drum screen 30 is formed of multiple sections.

FIG. 10 illustrates an additional drum frame element, namely a plurality of supporting bars 82. The supporting bars 82 extend longitudinally between the respective flange portions 80. The supporting bars 82 serve to provide support for the flight 38 or series of flights 38. In some embodiments, the flight 38 or series of flights 38 effectively provide a portion of the strength of the drum frame 48. In other embodiments, the flight 38 or series of flights 38 are secured to the drum frame 48 without providing significant structure to the drum frame 48.

Figure 13:
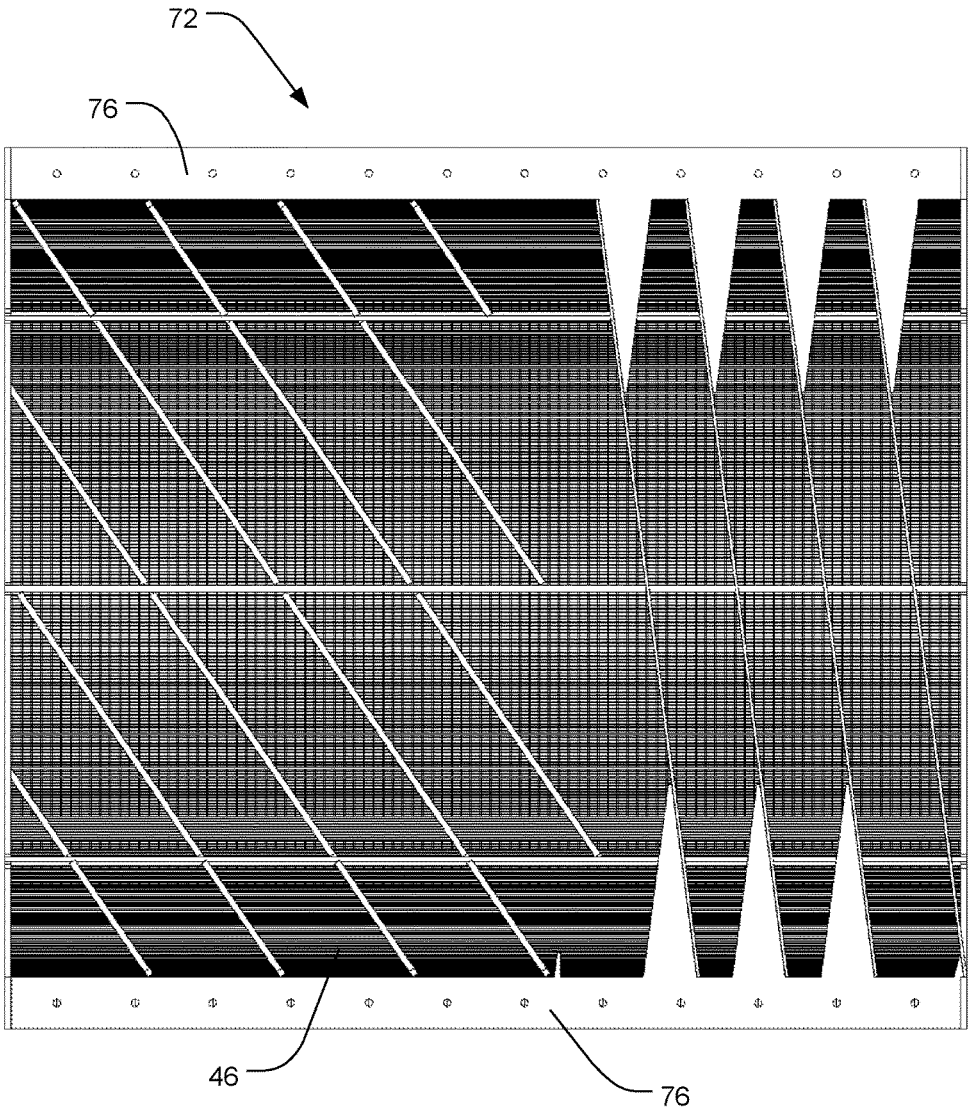
FIG. 13 shows a top view of the first section of the representative drum-frame-flight assembly of FIG. 10 with filter screen affixed to an outer surface thereof.
Figure 14:
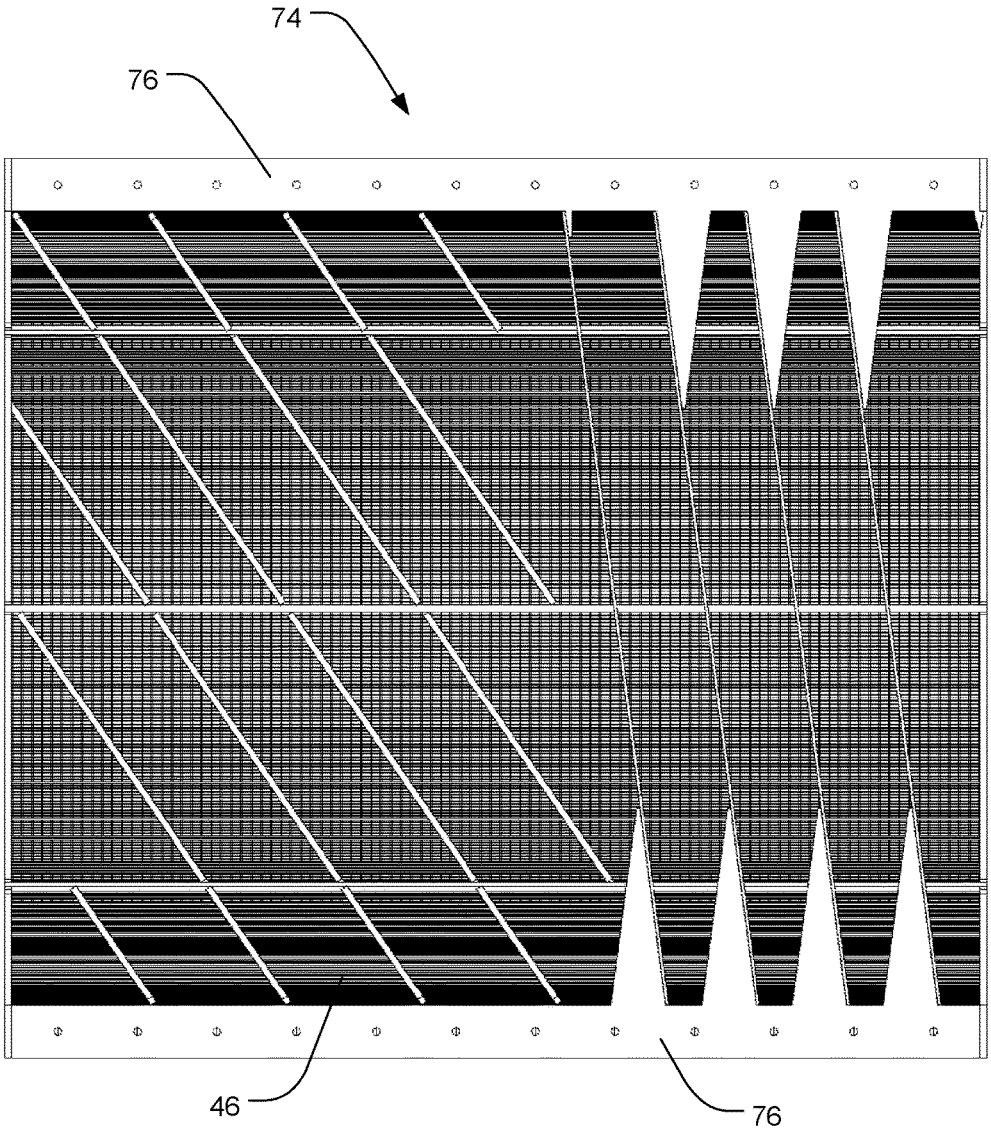
FIG. 14 shows a top view of the second section of the representative drum-frame-flight assembly of FIG. 10 with filter screen affixed to an outer surface thereof.
Figure 15:
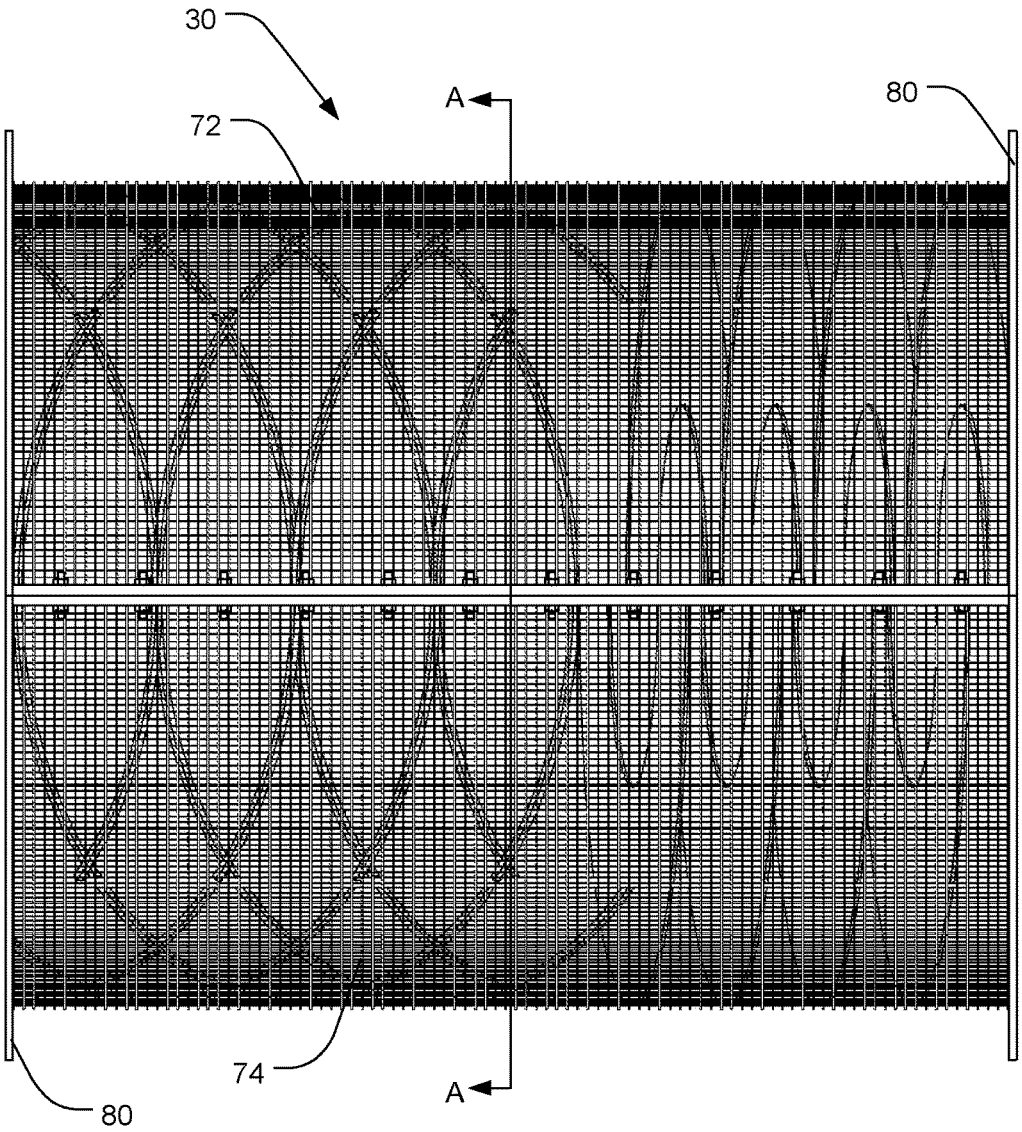
FIG. 15 shows a side view of a representative drum screen.

In the embodiment of the drum screen illustrated in FIGS. 10-19, the drum-frame-flight assembly 70 serves to receive sections of the filter screen 46 thereon. The sections of the filter screen 46 may be affixed to the drum-frame-flight assembly in any desirable fashion, including more-permanent forms of affixation such as welding, or more-reversible forms of affixation such as bolting. Where more-reversible forms of affixation are used, the sections of filter screen 46 may be individually removed for repair or replacement, facilitating repair of the drum screen 30 in situ without requiring complete disassembly of the rotary drum screen system 10, as has been discussed previously. FIGS. 13 and 14 illustrate top (inside-to-outside) views of the first section 72 and the second section 74, respectively, of the drum screen 30 of FIG. 10 after affixation of the sections of the filter screen 46. FIG. 15 illustrates a side (outside-to-inside) view of the fully assembled drum screen 30.

Figure 16:
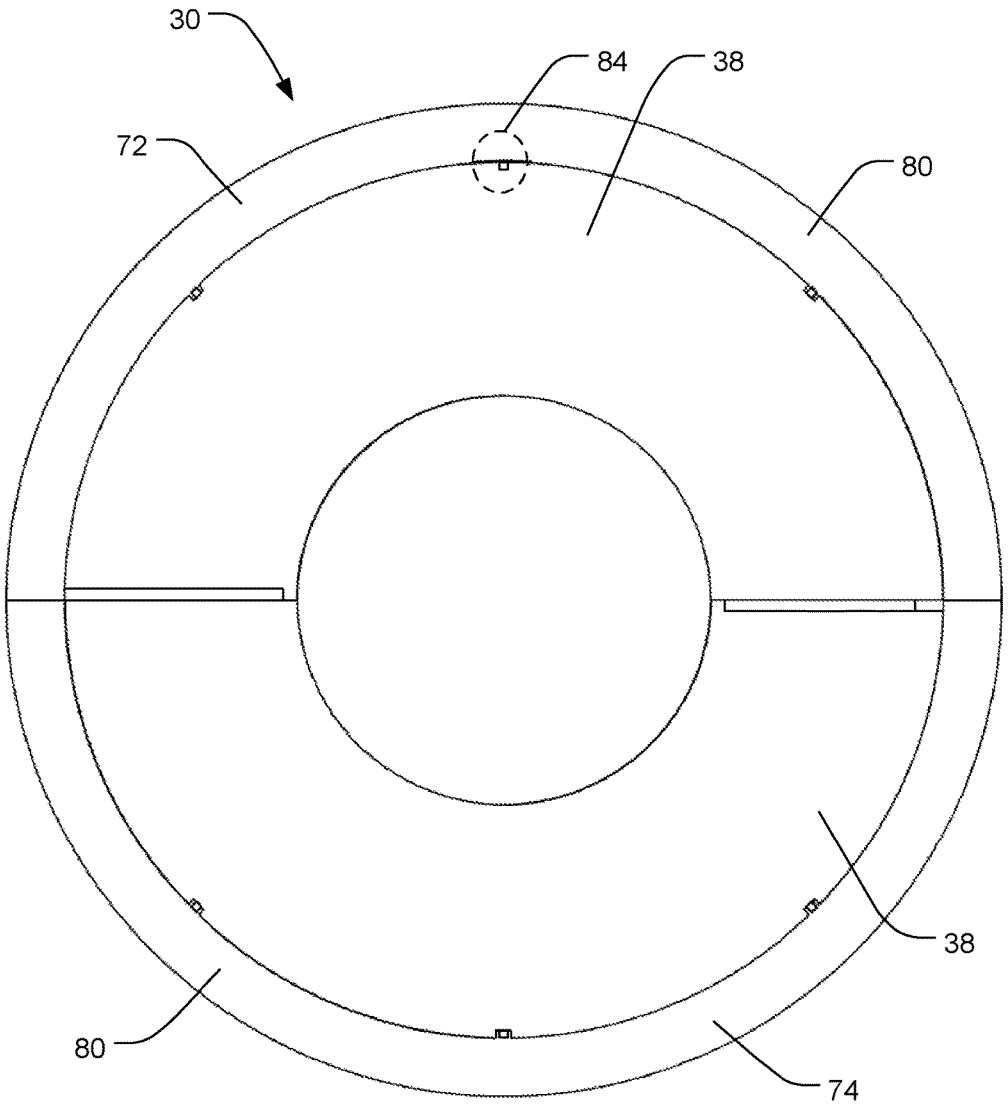
FIG. 16 shows an end view of a representative drum screen.

FIG. 16 illustrates an end view of the fully assembled drum screen 30 from the discharge end 34. This view illustrates the flange portions 80 of the first section 72 and of the second section 74. In this embodiment, as the drum screen 30 is fully formed as a single section, there are no apertures formed in the flange portions 80 to accept bolts or other fasteners. If, however, the drum screen 30 were to be formed of multiple sections, the flange portions 80 could be provided with apertures (as illustrated by the apertures in the bolting bars 76 shown in FIGS. 11-14) adapted to receive bolts or other fasteners to secure one section of the drum screen 30 to another section of the drum screen 30. As the view of FIG. 16 is from the discharge end 34, only the portions of the flight 38 or series of flights 38 having the higher height and lower pitch are visible.

Figure 17:
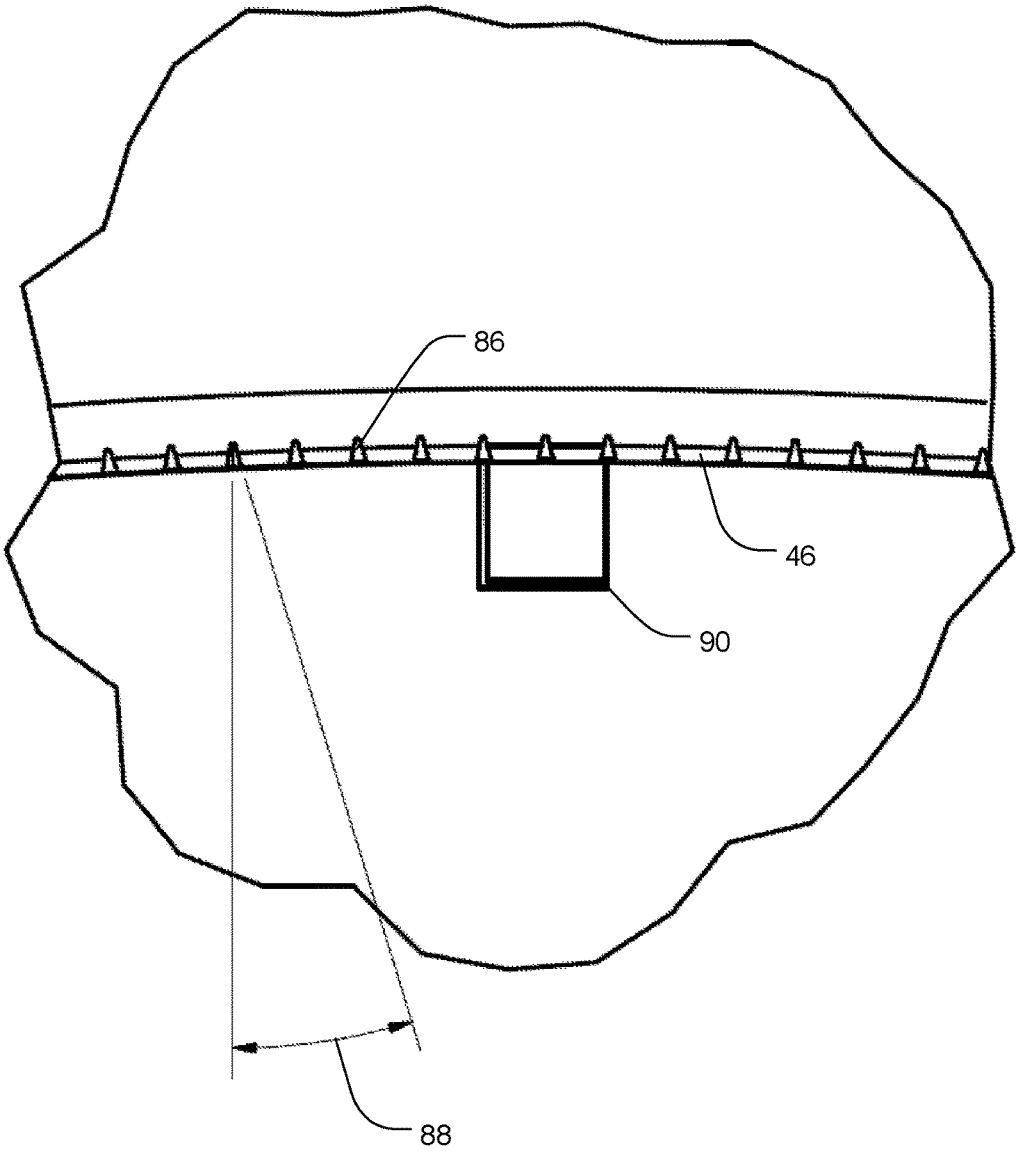
FIG. 17 shows an enlarged end view of a portion of screen of the representative drum screen of FIG. 16.

A portion of the drum screen 30 circled as portion 84 is illustrated in the enlarged view of FIG. 17. This enlarged view shows how the filter screen 46 is formed of parallel spaced wedge wires 86. As illustrated in FIG. 17, the wedge wires 86 may have a tip angle 88 (exaggerated in FIG. 17) of between approximately 3° to approximately 5°, or of between approximately 2° and approximately 8° to facilitate solids capture. FIG. 17 also illustrates use of a fastener 90 (e.g., bolt, screw, etc.) to secure the filter screen 46 to the drum frame 48.

Figure 18:
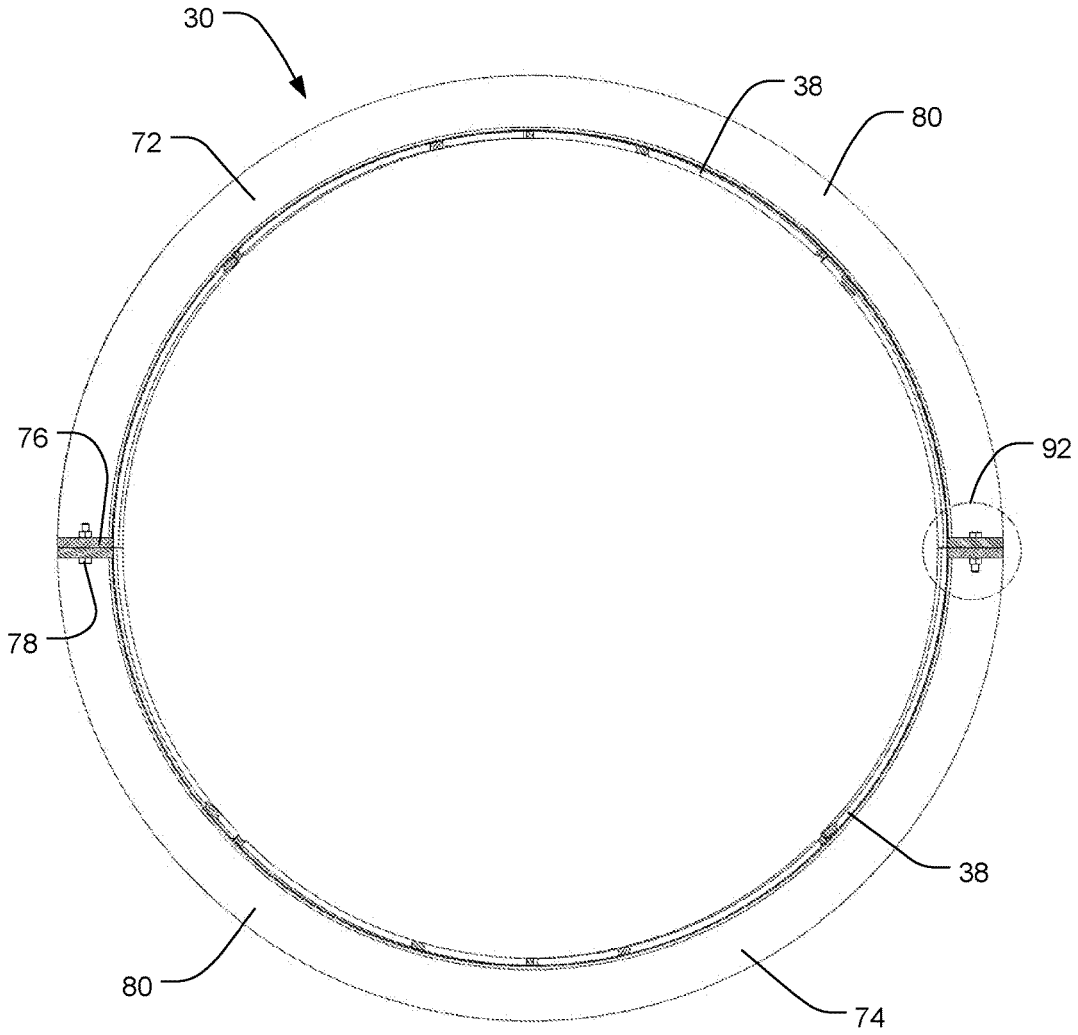
FIG. 18 shows a cross-sectional view of the representative drum screen of FIG. 16.

FIG. 18 shows a cross-sectional view of the drum screen 30 taken approximately along the line A-A in FIG. 15. As the view of FIG. 18 is taken from within the portion of the drum screen proximate the head box 50 looking toward the influent inlet end 36, only the portions of the flight 38 or series of flights 38 having the lower height and higher pitch are visible.

Figure 19:
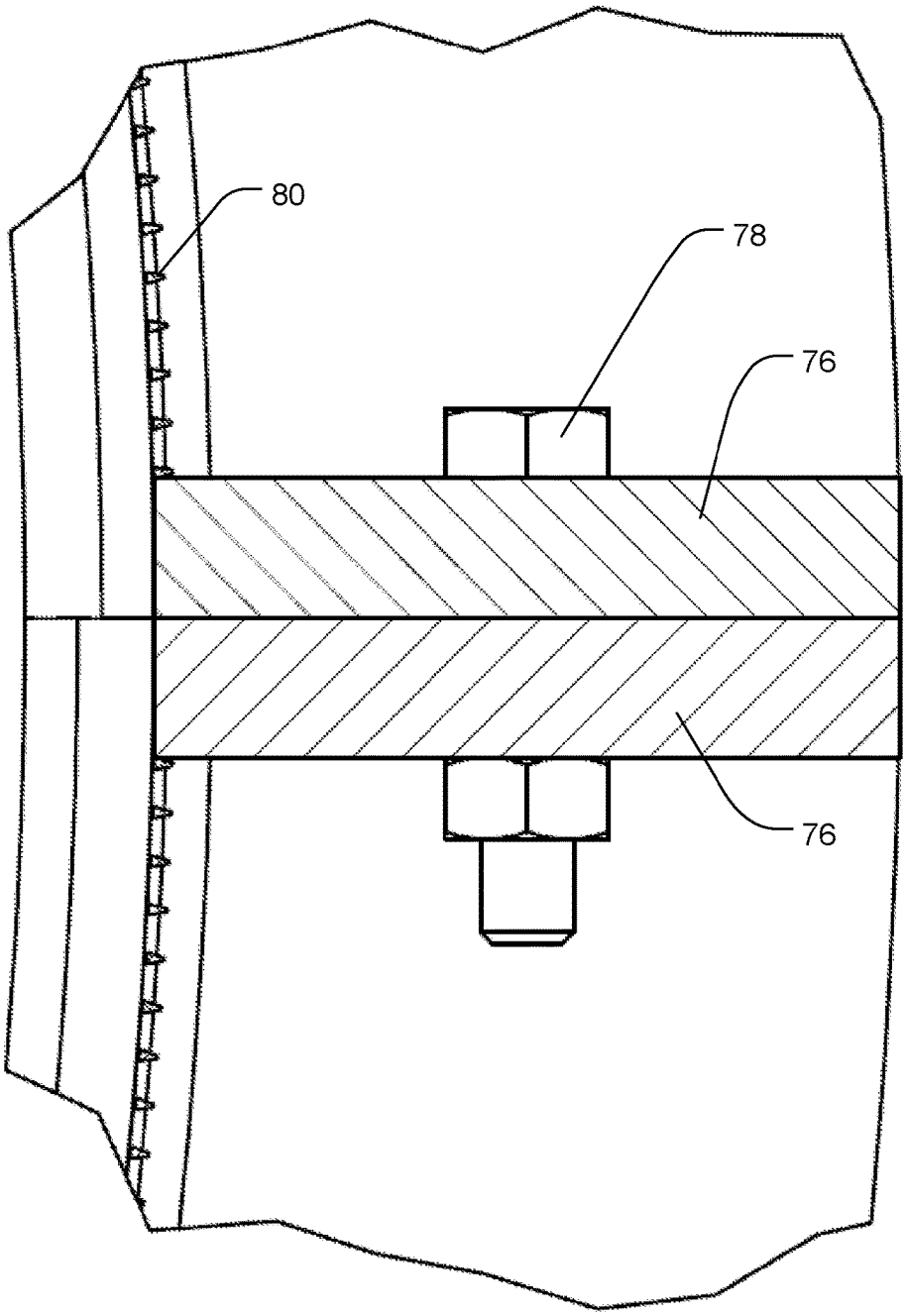
FIG. 19 shows an enlarged cross-sectional view of a joint between sections of the representative drum screen of FIG. 16.

A cross-sectional portion of the drum screen circled as portion 92 is illustrated in the enlarged view of FIG. 19. This enlarged view shows how the bolting bars 76 of the first section 72 and the second section 74 of the drum-frame-flight assembly 70 are secured together by bolts 78 to form the full section of the drum screen 30. While this embodiment uses bolts 78 to secure the sections 70, 72 together, and while this embodiment uses only two sections 70, 72 to form a full section of the drum screen 30, other embodiments use other fasteners or methods of fastening sections together (e.g. clips, welding, etc.), and other embodiments use sections that are other than 180° sections of the drum screen 30 (e.g., 120° sections, 90° sections, 60° sections, etc.), as desired. Accordingly, the embodiment of the drum screen illustrated in FIGS. 10-19 and the embodiments illustrated in all the Figures are in all respects to be considered illustrative of specific features of specific embodiments, and are not intended to be limiting of the scope of the invention as claimed herein.

Appended hereto as Appendix A are results of particle count tests done on thin stillage prior to and after separation using an embodiment of the system 10 to separate out the flocculated polymer-solid aggregate. The data was generated from a test using an anionic polymer. The tests confirm that the system 10 is able to separate much (in excess of 95%) of the solids as TSS with the remainder of the solids being smaller (less than 5 μm) in the form of dissolved organics from the post fermented corn solids used to make the alcohol.

The following are summaries of experimental results using embodiments of the system 10.

Example 1

In a first test, an influent was measured as having 52,800 mg/L TS and 7,200 mg/L TSS. The influent was delivered to a system 10 in which the filter screen 46 was not provided with the non-stick fluorocarbon coating and had a screen gap size of one hundred microns. Subsequent to the screening performed by the system 10, the resultant clarified thin stillage was measured as having 30,800 mg/L TS (a reduction of 41.7%) and 148 mg/L TSS (a reduction of 97.9%).

Example 2

In a second experiment, an influent was measured as having 13,800 mg/L TS and 695 mg/L TSS. The influent was again delivered to a system 10 in which the filter screen 46 was not provided with the non-stick fluorocarbon coating and had a screen gap size of 100 μm. Subsequent to the screening performed by the system 10, the resultant clarified thin stillage was measured as having 6,210 mg/L TS (a reduction of 45.0%) and 21 mg/L TSS (a reduction of 97.0%).

Example 3

In a third experiment, an influent was measured as having 44,800 mg/L TS and 19,800 mg/L TSS. The influent was again delivered to a system in which the filter screen 46 was not provided with the non-stick fluorocarbon coating and had a screen gap size of one hundred microns. Subsequent to the screening performed by the embodiment of the system 10, the resultant clarified thin stillage was measured as having 24,400 mg/L TS (a reduction of 45.5%) and 780 mg/L TSS (a reduction of 96.1%). In a fourth experiment, an influent was measured as having 107,000 mg/L TS and 47,800 mg/L TSS. This influent was delivered to a system 10 in which the filter screen 46 was provided with the non-stick fluorocarbon (PTFE) coating and had a screen gap size of one hundred microns. Subsequent to the screening performed by the system 10, the resultant clarified thin stillage was measured as having 21,600 mg/L TS (a reduction of 79.8%) and 14 mg/L TSS (a reduction greater than 99%). A fifth experiment utilized an influent that was measured as having 75,600 mg/L TS and 8,100 mg/L TSS. This influent was delivered to a system 10 in which the filter screen 46 was not provided with the non-stick fluorocarbon coating and had a screen gap size of one hundred fifty microns. Subsequent to the screening performed by the system 10, the resultant clarified thin stillage was measured as having 30,500 mg/L TS (a reduction of 40.3%) and 320 mg/L TSS (a reduction of 96.0%).

Example 4

In a fourth experiment, the percentage of solids collected as "syrup" was 24.4%. The first through fourth tests all used an anionic polyacrylamide high molecular weight synthetic polymer that is generally recognized as safe (GRAS) for reaction and separation.

Example 5

In a fifth experiment, the percentage of solids collected as "syrup" was 24.4%. In the fifth experiment, fat recovery as measured using acid hydrolysis was 91.3% in the solids fraction. The fifth test utilized a silica sol (colloidal silica) plus a cationic polymer (low molecular weight epichlorohydrin dimethylamine). The silica sol and cationic polymer test utilized a higher concentration of reagent (0.8 g/L silica and 0.8 g/L cationic polymer) than did the first through fourth tests, which used anionic polymer (20-24 mg/L). In all tests, the pH of the influent was 3.8-4.5 and the polymer reagent was added to hot (>60° C.) influent solution. The increased oil recovery seen with respect to the PTFE-coated screen of the fourth experiment is believed to be a result of the oleophobic nature of the screen coating, such that oils are preferentially driven to the solid phase. Testing showed fat recovery from thin stillage reacted with anionic polymer of between 84% and 94% percent, while fat recovery from thin stillage reacted with cationic polymer plus silica sol of between 89% and 97.6%.

One embodiment of the invention utilizes a coated screen (PTFE) silica sols and cationic polymer for flocculation, and the head box 30 illustrated in the Figures. Such an embodiment should recover greater than 26% of the solids from the reaction. The embodiment would also recover 93% of fats from the influent thin stillage. The clarified thin stillage has a 45% reduction in TS and a greater than 98% reduction in TSS.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

The invention claimed is:

1. A rotating drum screen method for separating solids from thin stillage obtained from ethanol fermentation, the thin stillage comprising one or more of solids and suspended solids, the rotating drum screen method comprising:

chemically treating the thin stillage with an anionic polymer to form stable particles of one or more of solids and suspended solids;

introducing the treated thin stillage into a rotating drum screen system comprising:

a housing having an influent inlet at an influent inlet end, a solid discharge end, and an area between the influent inlet end and the solid discharge end, the influent inlet permitting a flow of treated thin stillage into a hollow portion of a drum screen positioned lengthwise in the area between the influent inlet end and the solid discharge end, the drum screen comprising a filter screen that retains at least a portion of the stable particles within the hollow portion of the drum screen and which produces a liquid effluent that is discharged from an outer surface of the drum screen, the retained portion of stable particles being removed from the drum screen via the solid discharge end; and a head box disposed within the hollow portion of the drum screen proximate the influent inlet end and in fluid communication with the influent inlet, the head box being configured to direct the treated thin stillage outwardly against the drum screen; and directing the treated thin stillage against the drum screen wherein the filter screen retains at least a portion of the stable particles and produces the liquid effluent that is discharged from the outer surface of the drum screen.

2. The rotating drum screen method as recited in claim 1, wherein the head box is disposed at an elevated position within the drum screen, such that the treated thin stillage initially contacts the drum screen at a position between a top-to-bottom centerline of the drum screen and approximately 30° below the top-to-bottom centerline of the drum screen.

3. The rotating drum screen method as recited in claim 2, wherein the elevated position of the head box causes the treated thin stillage to initially contact the drum screen at a position between 5° to 20° below the top-to-bottom centerline of the drum screen.

4. The rotating drum screen method as recited in claim 1, wherein the influent inlet and a portion of the head box in contact with the influent inlet has a rectangular cross-section.

5. The rotating drum screen method as recited in claim 1, wherein the drum screen comprises a flight or series of flights extending from an inner surface of the drum screen along a spiral path, the flight or series of flights having a variable height along the drum screen, with a first, lower, height proximate the influent inlet end and permitting a discharge of the head box to be placed proximate the filter screen, and with a second, higher, height proximate the solid discharge end.

6. The rotating drum screen method as recited in claim 5, wherein the first, lower, height of the flight or series of flights proximate the influent end is a height less than or equal to approximately 2.5 cm.

7. The rotating drum screen method as recited in claim 5, wherein the second, higher, height of the flight or series of flights proximate the solid discharge end has a height between 2.5 cm and 25% to 50% of a filter-screen-to-filter-screen diameter of the drum screen.

8. The rotating drum screen method as recited in claim 1, further comprising spraying a fluid through the filter screen in an exterior-to-interior direction, wherein the fluid is selected from the group consisting of:

air;

a mixture of air and an aqueous solution; and an aqueous solution.

9. The rotating drum screen method as recited in claim 1, wherein the drum screen comprises a non-stick perfluorocarbon coating disposed on the filter screen.

10. The rotating drum screen method as recited in claim 9, wherein the non-stick perfluorocarbon coating comprises a material selected from the group consisting of polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

11. The rotating drum screen method as recited in claim 1, wherein the drum screen rotates in a direction opposite a direction in which the treated thin stillage contacts the drum screen.

12. The rotating drum screen method as recited in claim 1, wherein the drum screen rotates at a rate between approximately 4 revolutions per minute (rpm) and approximately 25 rpm.

13. The rotating drum screen method as recited in claim 1, wherein the anionic polymer has a molecular weight greater than 10,000,000 Da.

14. A rotating drum screen method for separating solids from thin stillage obtained from ethanol fermentation, the thin stillage comprising one or more of solids and suspended solids, the rotating drum screen method comprising:

chemically treating the thin stillage with an anionic polymer a molecular weight greater than 10,000,000 Da to form stable particles of one or more of solids and suspended solids;

introducing the treated thin stillage into a rotating drum screen system comprising:

a housing having an influent inlet at an influent inlet end, a solid discharge end and an area between the influent inlet end and the solid discharge end, the influent inlet permitting a flow of treated thin stillage into a hollow portion of a drum screen positioned lengthwise in the area between the influent inlet end and the solid discharge end, the drum screen comprising a filter screen that retains at least a portion of the stable particles within the hollow portion of the drum screen and which produces a liquid effluent that is discharged from an outer surface of the drum screen, the retained stable particles being removable from the drum screen via the solid discharge end, wherein the filter screen has a size in the range of 25 μm and 150 μm; and a head box disposed within the hollow portion of the drum screen proximate the influent inlet end and in fluid communication with the influent inlet, the head box comprising a plurality of parallel fluid flow channel dividers dividing the flow of treated thin stillage received at the influent inlet into a plurality of parallel ongoing streams; and directing the plurality of ongoing streams outwardly against the drum screen wherein the filter screen retains at least a portion of the stable particles and produces the liquid effluent that is discharged from the outer surface of the drum screen.

15. The rotating drum screen method as recited in claim 14, wherein the head box is disposed at an elevated position within the drum screen, such that the treated thin stillage initially contacts the drum screen at a position between a top-to-bottom centerline of the drum screen and approximately 30° below the top-to-bottom centerline of the drum screen.

16. The rotating drum screen method as recited in claim 14 wherein the drum screen comprises a flight or series of flights extending from an inner surface of the drum screen along a spiral path, the flight or series of flights having a variable height along the drum screen, with a first, lower, height proximate the influent inlet end and permitting a discharge of the head box to be placed proximate the filter screen, and with a second, higher, height proximate the solid discharge end.

17. The rotating drum screen method as recited in claim 14, further comprising spraying a fluid through the filter screen in an exterior-to-interior direction, wherein the fluid is selected from the group consisting of:

air;

a mixture of air and an aqueous solution; and an aqueous solution.

18. The rotating drum screen method as recited in claim 14, wherein the drum screen comprises a non-stick coating disposed on the filter screen.

19. The rotating drum screen method as recited in claim 18, wherein the non-stick coating comprises a material selected from the group consisting of polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

20. The rotating drum screen method as recited in claim 14, wherein the drum screen rotates at a rate between approximately 4 revolutions per minute (rpm) and approximately 25 rpm.

*21. A rotating drum screen method for separating solids from thin stillage obtained from ethanol fermentation, the thin stillage comprising one or more of solids and suspended solids, the rotating drum screen method comprising:*

*chemically treating the thin stillage with a cationic polymer to form stable particles of one or more of solids and suspended solids;*

*introducing the treated thin stillage into a rotating drum screen system comprising:*

*a housing having an influent inlet at an influent inlet end, a solid discharge end, and an area between the influent inlet end and the solid discharge end, the influent inlet permitting a flow of treated thin stillage into a hollow portion of a drum screen positioned lengthwise in the area between the influent inlet end and the solid discharge end, the drum screen comprising a filter screen that retains at least a portion of the stable particles within the hollow portion of the drum screen and which produces a liquid effluent that is discharged from an outer surface of the drum*

*screen, the retained portion of stable particles being removed from the drum screen via the solid discharge end; and*

*a head box disposed within the hollow portion of the drum screen proximate the influent inlet end and in fluid communication with the influent inlet, the head box being configured to direct the treated thin stillage outwardly against the drum screen; and*

*directing the treated thin stillage against the drum screen wherein the filter screen retains at least a portion of the stable particles and produces the liquid effluent that is discharged from the outer surface of the drum screen.*

*22. The rotating drum screen method as recited in claim 21, wherein the head box is disposed at an elevated position within the drum screen, such that the treated thin stillage initially contacts the drum screen at a position between a top-to-bottom centerline of the drum screen and approximately 30° below the top-to-bottom centerline of the drum screen.*

*23. The rotating drum screen method as recited in claim 22, wherein the elevated position of the head box causes the treated thin stillage to initially contact the drum screen at a position between 5° to 20° below the top-to-bottom centerline of the drum screen.*

*24. The rotating drum screen method as recited in claim 21, wherein the influent inlet and a portion of the head box in contact with the influent inlet has a rectangular cross-section.*

*25. The rotating drum screen method as recited in claim 21, wherein the drum screen comprises a flight or series of flights extending from an inner surface of the drum screen along a spiral path, the flight or series of flights having a variable height along the drum screen, with a first, lower, height proximate the influent inlet end and permitting a discharge of the head box to be placed proximate the filter screen, and with a second, higher, height proximate the solid discharge end.*

*26. The rotating drum screen method as recited in claim 21, further comprising spraying a fluid through the filter screen in an exterior-to-interior direction, wherein the fluid is selected from the group consisting of:*

*air;*

*a mixture of air and an aqueous solution; and*

*an aqueous solution.*

*27. The rotating drum screen method as recited in claim 21, wherein the drum screen comprises a non-stick perfluorocarbon coating disposed on the filter screen.*

*28. The rotating drum screen method as recited in claim 27, wherein the non-stick perfluorocarbon coating comprises a material selected from the group consisting of polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).*

*29. The rotating drum screen method as recited in claim 21, wherein the drum screen rotates in a direction opposite a direction in which the treated thin stillage contacts the drum screen.*

*30. The rotating drum screen method as recited in claim 21, wherein the drum screen rotates at a rate between approximately 4 revolutions per minute (rpm) and approximately 25 rpm.*

*31. A rotating drum screen method for separating solids from thick and/or thin stillage obtained from ethanol fermentation, the thick and/or thin stillage comprising one or more of solids and suspended solids, the rotating drum screen method comprising:*

*chemically treating the thick and/or thin stillage with a polymer to form stable particles of one or more of solids and suspended solids;*

*introducing the treated thick and/or thin stillage into a rotating drum screen system comprising:*

*a housing having an influent inlet at an influent inlet end, a solid discharge end, and an area between the influent inlet end and the solid discharge end, the influent inlet permitting a flow of treated thick and/or thin stillage into a hollow portion of a drum screen positioned lengthwise in the area between the influent inlet end and the solid discharge end, the drum screen comprising a filter screen that retains at least a portion of the stable particles within the hollow portion of the drum screen and which produces a liquid effluent that is discharged from an outer surface of the drum screen, the retained portion of stable particles being removed from the drum screen via the solid discharge end; and*

*a head box disposed within the hollow portion of the drum screen proximate the influent inlet end and in fluid communication with the influent inlet, the head box being configured to direct the treated thick and/or thin stillage outwardly against the drum screen; and*

*directing the treated thick and/or thin stillage against the drum screen wherein the filter screen retains at least a portion of the stable particles and produces the liquid effluent that is discharged from the outer surface of the drum screen.*

*32. The rotating drum screen method as recited in claim 31, wherein the head box is disposed at an elevated position within the drum screen, such that the treated thin stillage initially contacts the drum screen at a position between a top-to-bottom centerline of the drum screen and approximately 30° below the top-to-bottom centerline of the drum screen.*

*33. The rotating drum screen method as recited in claim 32, wherein the elevated position of the head box causes the treated thin stillage to initially contact the drum screen at a position between 5° to 20° below the top-to-bottom centerline of the drum screen.*

*34. The rotating drum screen method as recited in claim 31, wherein the influent inlet and a portion of the head box in contact with the influent inlet has a rectangular cross-section.*

*35. The rotating drum screen method as recited in claim 31, wherein the drum screen comprises a flight or series of flights extending from an inner surface of the drum screen along a spiral path, the flight or series of flights having a variable height along the drum screen, with a first, lower, height proximate the influent inlet end and permitting a discharge of the head box to be placed proximate the filter screen, and with a second, higher, height proximate the solid discharge end.*

*36. The rotating drum screen method as recited in claim 31, further comprising spraying a fluid through the filter screen in an exterior-to-interior direction, wherein the fluid is selected from the group consisting of:*

*air;*

*a mixture of air and an aqueous solution; and*

*an aqueous solution.*

*37. The rotating drum screen method as recited in claim 31, wherein the drum screen comprises a non-stick perfluorocarbon coating disposed on the filter screen.*

*38. The rotating drum screen method as recited in claim 37, wherein the non-stick perfluorocarbon coating com-*

*prises a material selected from the group consisting of polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).*

*39. The rotating drum screen method as recited in claim 31, wherein the drum screen rotates in a direction opposite a direction in which the treated thin stillage contacts the drum screen.*

*40. The rotating drum screen method as recited in claim 31, wherein the drum screen rotates at a rate between approximately 4 revolutions per minute (rpm) and approximately 25 rpm.*

* * * * *